(12) United States Patent
Iwu et al.

(10) Patent No.: US 12,129,396 B2
(45) Date of Patent: Oct. 29, 2024

(54) POLYSILAZANE COMPOSITIONS

(71) Applicant: NANIZE AS, Narviik (NO)

(72) Inventors: Kingsley Odinaka Iwu, Narvik (NO); Nguyen Hong Quang, Narvik (NO); Vivek Kumar Singh, Narvik (NO); Anisa Yaseen, Narvik (NO)

(73) Assignee: NANIZE AS, Narvik (NO)

( * ) Notice: Subject to any disclaimer, the term of this patent is extended or adjusted under 35 U.S.C. 154(b) by 0 days.

(21) Appl. No.: 18/576,606

(22) PCT Filed: Jul. 7, 2022

(86) PCT No.: PCT/NO2022/050167
§ 371 (c)(1),
(2) Date: Jan. 4, 2024

(87) PCT Pub. No.: WO2023/282768
PCT Pub. Date: Jan. 12, 2023

(65) Prior Publication Data
US 2024/0287352 A1 Aug. 29, 2024

(30) Foreign Application Priority Data
Jul. 7, 2021 (NO) .................................. 20210883

(51) Int. Cl.
| C09D 183/16 | (2006.01) |
| C08G 77/04 | (2006.01) |
| C08G 77/62 | (2006.01) |
| C08K 7/02 | (2006.01) |
| C09D 7/40 | (2018.01) |
| C09D 7/47 | (2018.01) |

(52) U.S. Cl.
CPC ......... *C09D 183/16* (2013.01); *C08G 77/045* (2013.01); *C08G 77/62* (2013.01); *C08K 7/02* (2013.01); *C09D 7/47* (2018.01); *C09D 7/70* (2018.01); *C08K 2201/011* (2013.01)

(58) Field of Classification Search
CPC ........ C08G 77/405; C08G 77/62; C08K 7/02; C08K 2201/011; C09D 7/47; C09D 7/70; C09D 183/16
See application file for complete search history.

(56) References Cited

U.S. PATENT DOCUMENTS

| 9,593,241 | B2 | 3/2017 | Joo et al. | |
| 11,692,108 | B2 * | 7/2023 | Ahn | C08G 77/14 |
| | | | | 427/595 |
| 2015/0376407 | A1 * | 12/2015 | Joo | C08L 83/06 |
| | | | | 525/100 |

FOREIGN PATENT DOCUMENTS

| CN | 105008461 A | | 10/2015 | |
| CN | 115073750 A | * | 9/2022 | |
| WO | WO-2017217201 A1 | * | 12/2017 | ............... G02B 5/02 |

OTHER PUBLICATIONS

WIPO/ISA/EPO, International Search Report and Written Opinion issued on Oct. 31, 2022 in PCT/NO2022/050167, 8 pages.

* cited by examiner

*Primary Examiner* — Sanza L. McClendon
(74) *Attorney, Agent, or Firm* — J. Peter Paredes; Amin Wasserman Gurnani LLP

(57) ABSTRACT

The present invention relates to polysilazane compositions, in particular to a composition, the use of said composition for coating a substrate, and a substrate comprising a coating made from said composition.

16 Claims, 4 Drawing Sheets

POLYSILAZANE COMPOSITIONS

CROSS-REFERENCE TO RELATED APPLICATIONS

The present application claims priority to PCT application serial no. PCT/NO2022/050167 filed Jul. 7, 2022, which claims priority to Norwegian patent application Ser. No. 20/210,883, filed Jul. 7, 2021, herein incorporated by reference in their entireties.

FIELD OF THE INVENTION

The present invention relates to polysilazane compositions, in particular to a composition, the use of said composition for coating a substrate, and a substrate comprising a coating made from said composition.

BACKGROUND OF THE INVENTION

Protection of various surfaces from soiling, including pollution and contamination, is of high importance in a wide range of technical fields. Surfaces having anti-soiling or self-cleaning properties, such as being resistant to chemical and physical bonding of dirt particles and other types of soiling, are not only of vital importance for photovoltaic modules and solar thermal systems, but also for purposes as mundane as preventing fingerprint marks and smudges on smartphones or graffiti on walls and making those surfaces easy to clean when fouled. Anti-soiling, anti-staining, and corrosion protection properties are widely sought-after properties of coatings. Due to the different requirements for coatings to be used in widely different fields, there is a continuous need for new anti-soiling coatings that combine the anti-soiling properties with specific coating features tailored for a certain use.

Anti-soiling properties of certain inert organic molecules such as polymers are related to the coefficient of friction (CoF). The lower the CoF, the more slippery a surface is under load. A low CoF makes it, for example, easier to brush of any fouling that eventually accumulates on the surface with no or little mechanical damage to the surface. It may also make higher impact particles, e.g. sand particles in a sandstorm, bounce off the surface without causing significant wear. Further, a low CoF may also be desirable for enhanced human experience, for example the smooth feeling of the screen of a new smart phone. One example of coatings that may have such desirable properties are fluoropolymers, which may be used to obtain this soft, smooth feel and good anti-fingerprint and anti-smudge property.

Further, there is a need for coatings having a low refractive index. The refractive index, a most fundamental quantity in optics and optoelectronics, determines many figures of merit of optical components such as reflectors, filters, and resonators. It determines the focusing power of lenses, the dispersive power of prisms, the reflectivity of lens coatings, and the light-guiding nature of optical fibre. When passing into a medium with low refractive index, light will be refracted away from the normal, towards the surface of the medium.

Polysilazanes, a group of polymers characterised by their Si—N—Si backbone, have attracted increasing interest over the recent years for their use in coatings. Depending on the type and formulation of the coating, polysilazane coatings can display a range of favourable properties; the high reactivity of the polysilazanes can result in coatings with e.g. high hardness and weatherability, excellent adhesion properties and scratch and wear resistance, low surface roughness, and high gloss on painted surfaces. Excellent thermal, chemical and UV resistances have been documented. Organic polysilazane coatings are reported to have a pencil hardness of 5H when cured at room temperature, contrasting the more widely used (poly)siloxane coatings with pencil hardness of 5B using the same curing conditions. Other polysilazane coatings have a coefficient of friction between 0.03 and 0.05, as shown in WO2014008443A2, similar to the 0.04 of the famous anti-stick, Teflon, but with far better scratch and wear resistance. Coating hardness as high as 3 GPa have been reported for inorganic perhydropolysilazane coatings cured under UV light/$H_2O_2$ or $H_2O_2$/80° C. (yielding $SiO_2$), and an impressive 13 GPa with curing in air at 700-1000° C., attesting to the depth of cross-linking in the functional units of polysilazane. Set apart from other common polymers such as (poly)siloxane, polyurethane, epoxy resin, PMMA, often employed because of their ease of use and/or low reactivity at ambient conditions, polysilazanes have, with their high reactivity, been referred to as the ultimate binder among its class (polymers used in wet chemistry formulation). While polysilazane coatings have been used for purposes such as permanent anti-fingerprint coatings on metal surfaces, as disclosed in US 2008/0131706 A1, they have yet to find widespread use as anti-soiling coatings.

Coating formulations comprising polysilazane and other components are known in the art. One example is a formulation of siloxane resin, organic polysilazane and an alkyl or aryl bearing polyhedral oligomeric silsesquioxane in U.S. Pat. No. 9,593,241 B2, which yielded coating with refractive index of 1.52-1.54. Due to the high reactivity of polysilazane to nucleophilic groups, additives used in coating formulations are often devoid of these groups, or their concentrations are kept very low. Such nucleophilic groups, which include hydroxyl, amine, and unsaturated bonds involving hetero atoms (e.g. carbonyl, S=O), are known to cause fragmentation of the polysilazane. However, these groups may be useful for covalently binding additives to polysilazane in a coating; thus, their exclusion means that polysilazane and additives are not covalently and strongly bound together, which may lead to negative effects like leaching of the additives from the coating or phase separation. Hence, there is a need for improved polysilazane coatings.

BRIEF SUMMARY OF THE INVENTION

Figure 1:
FIG. 1 shows a high magnification light microscope image of the coating of sample 48T-2.

In a first aspect, the present invention relates to a composition as claimed in claim 1, wherein the composition comprises
i) 0.5-30 wt %, based on the weight of the composition, of a polysilazane component selected from the group of organic polysilazanes, inorganic polysilazanes, and mixtures of any two or more organic and/or inorganic polysilazanes;
ii) 0.1-15 wt %, based on the weight of the composition, of a POSS comprising at least one nucleophilic group;
iii) 0.0001-2 wt %, based on the weight of the composition, of a quaternary ammonium salt $R^1R^2R^3R^4N+X^-$, wherein each of $R^1$, $R^2$, $R^3$, and $R^4$ is independently selected from the group comprising alkyl, aryl, arylalkyl, alkoxysilyl, and alkenyl, and wherein X is selected from F, Cl, Br, I, $PF_6$ or $BF_4$ and OH; and
iv) an inert solvent.

In a second aspect, the invention relates to the use of said composition according to any of the preceding claims for coating a substrate.

In a third aspect, the invention relates to a substrate comprising a coating, wherein the coating is made at least in part from said composition.

DETAILED DESCRIPTION OF THE INVENTION

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art.

In one aspect, the invention provides a coating composition comprising a polysilazane component, a POSS, and a quaternary ammonium salt. When the coating composition of the invention is coated onto a substrate, the coating that results after curing has advantageous properties, such as favourable anti-soiling properties and/or low refractive index.

As used herein, the term "the resulting coating" refers to a coating resulting from application of a particular coating composition, optionally along with other components, onto a substrate, followed by curing to obtain a coating. The term is used interchangeably with the term "coating" when the intended meaning is clear. The term "coating" as used herein means any layer, film or covering on a surface of an object, typically referred to as a "substrate". The coating may be substantially continuous, or it may be discontinuous. It may cover an entire surface or only parts of a surface. It may be a single layer coating or a multiple layer coating. The terms "cure" and "curing" as used herein refer to any type of toughening and/or hardening of a coating composition upon application onto a substrate, and may or may not be actively induced, such as by heat, plasma, radiation, electron beams, and/or a chemical additive.

As all of the compositions disclosed and claimed herein may be used for coating purposes, e.g. for forming a coating, the terms "composition" and "coating composition" are used interchangeably.

The present invention provides a coating composition comprising
i) 0.5-30 wt %, based on the weight of the composition, of a polysilazane component selected from the group of organic polysilazanes, inorganic polysilazanes, and mixtures of any two or more organic and/or inorganic polysilazanes;
ii) 0.1-15 wt %, based on the weight of the composition, of a POSS comprising at least one nucleophilic group;
iii) 0.0001-2 wt %, based on the weight of the composition, of a quaternary ammonium salt $R^1R^2R^3R^4N+X^-$, wherein each of $R^1$, $R^2$, $R^3$, and $R^4$ is independently selected from the group comprising alkyl, aryl, arylalkyl, alkoxysilyl, and alkenyl, and wherein X is selected from F, Cl, Br, I, $PF_6$ or $BF_4$ and OH; and
iv) an inert solvent.

The composition of the invention comprises a polysilazane component. The polysilazane component may comprise from 0.5 to 30 wt %, based on the weight of the composition, of a polysilazane component selected from the group comprising or consisting of organic polysilazanes, inorganic polysilazanes, and mixtures of any two or more organic and/or inorganic polysilazanes. Preferably, the polysilazane component is selected from an organic polysilazane, a mixture of two or more organic polysilazanes, or a mixture of one or more organic polysilazanes with one or more perhydropolysilazanes. As used herein, the term "organic polysilazane" ("OPSZ") is used to refer to any polysilazane of the formula [R'R"Si—NR'"]n, wherein at least one of R', R", and R'" is an organic substituent, the remainder(s) being hydrogen, wherein an organic substituent is defined as any substituent comprising carbon. The terms "perhydropolysilazane" ("PHPS") and "inorganic polysilazane" are used interchangeably to refer to any polysilazane of the formula $[H_2Si—NH]_n$.

Polysilazanes present in the coating composition of the invention can be linear or branched. They may be cyclic. The polysilazane component advantageously comprises an organic polysilazane wherein one or more, preferably all, of the organic substituents are selected from the group of linear, branched, cyclic and/or aromatic $C_1$-$C_6$ alkyl, such as methyl, ethyl, propyl, isopropyl, butyl, iso-butyl, tert-butyl, phenyl, vinyl ₃-(triethoxysilyl)propyl and 3-(trimethoxysilylpropyl). Preferably one or more of the organic substituents are selected from the group of methyl and ethyl. However, in some embodiments, one or more of the organic substituents are selected from linear or branched $C_5$-$C_{10}$ alkyl, preferably branched $C_5$-$C_{10}$ alkyl. Advantageously, the organic substituents do not comprise triple bonds or double bonds except C=C bonds. The organic substituents may comprise heteroatoms.

The polysilazane component may, e.g., have a number average molecular weight (Mn) in the range of 150 to 150,000 g/mol. As understood by the person skilled in the art, the polysilazane component can be selected in order to obtain certain properties of a resulting coating, for example hydrophobicity, refractive index and anti-soiling properties.

The inclusion of the organic polysilazane known by the trademark Durazane 1800 ("D1800") (structure I) in compositions comprising the organic polysilazane Durazane 1500 Rapid Cure ("D1500 RC") was observed by the inventors to positively affect coating quality, especially with a high concentration of nucleophilic groups on the POSS and/or high concentration of another more reactive polysilazane in the compositions. The structure of D1500 RC is indicated below (structure II). a, b and c are proprietary information not known by the present inventors. In addition to the propyl triethoxysilane grafted on backbone of the polymer, D1500 RC may also have 3 amino propyltriethoxy silane (APTES) added to serve as an additional curing agent. According to information provided by the manufacturer, Merck, the total amount of propyltriethoxysilane and APTES in D1500 RC is greater than 10 and less than 30% based on the total weight of the composition.

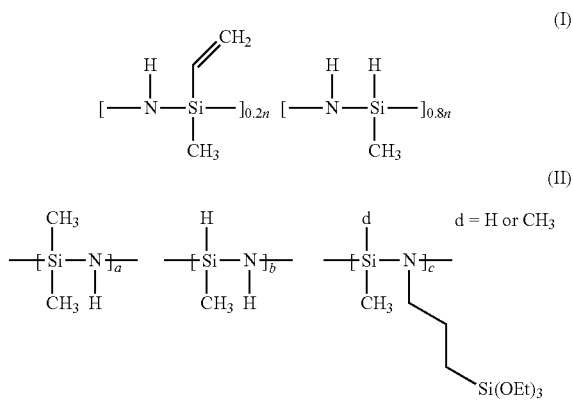

By visual inspection, it was found that the coatings in experiment 1 comprising D1800 were smoother and more uniform and had better anti-soiling characteristics than the corresponding coatings without D1800. These effects may be attributed to the facts that D1800 is more sterically hindered than D1500 RC, which may lead to a slower and more controlled reaction; the vinyl group of D1800, which on curing becomes ethyl, is more hydrophobic than the methyl groups of D1800; and the higher amount of organic groups in D1800 may allow it to act as a surfactant, improving film forming properties of the composition.

D1800, D1500 RC and Durazane 1500 Slow Cure ("D1500 SC") all represent examples of preferred polysilazane components. There is no information available on the structure of D1500 SC, which is also produced by Merck, but D1500 SC is believed to not contain grafted triethoxysilane (Z=0) but "free" APTES in the range of greater than 3 and less than 10% (hence it cures slower than D1500 RC). The organic group in D1500 SC is believed to be methyl.

The polysilazane component is present in an amount of 0.5-30 wt %, based on the weight of the total coating composition, such as 1-8 wt %, such as 5-15 wt %, such as 20-30 wt %. The skilled person will appreciate that the amount of polysilazane may be selected e.g. based on the technique that will be used for application of the coating composition to a substrate.

The composition of the invention comprises a POSS. POSS, or polyhedral oligomeric silsesquioxanes, are compounds of the chemical formula $[RSiO_{3/2}]_n$ (R=H, alkyl, aryl, arylalkyl, or alkoxyl, fluoroalkyl, perfluoroalkyl, siloxane/(poly)siloxane, ether/polyether), which may have a cage-like structure (FIG. 1), and their chemical composition is a hybrid, intermediate $(RSiO_{1.5})_n$ between that of silica ($SiO_2$) and silicone $(R_2SiO)_n$. Each POSS molecule may contain covalently bonded reactive functionalities suitable for polymerisation or grafting POSS monomers to polymer chains, as well as nonreactive organic functionalities for solubility and compatibility of the POSS with various polymer systems. A range of different POSS molecules are available, and more are under development.

Advantages of POSS includes the fact that the small size of 1-3 nm (Si—O—Si core) makes mixing with polysilazane at the molecular level possible, and that POSS behave like molecules rather than like typical nanoparticles, enabling highly stable concentrated dispersions of POSS in different solvents. Hence, formulation of a coating composition is facilitated. Further, the Si—O—Si basis of the POSS molecules means that light transmittance of a coating is not adversely affected when a POSS is included in the coating.

When used in the coating compositions of the invention, the ball-like nature of the POSS molecule may contribute to reducing the coefficient of friction of the resulting coatings, relative to comparable coatings not comprising POSS, when the rigid Si—O—Si frame is combined with and surrounded by low friction (slippery) molecules, for example alkyl, fluoroalkyl from either polysilazane or POSS itself—the POSS may be seen as balls acting like a roller for a slippery component.

The R groups of the POSS may be independently selected from the group comprising or consisting of H, alkyl, aryl, arylalkyl, alkoxyl, alkoxysilyl, or alkenyl. In some embodiments, the R groups are selected from H, $C_1$-$C_{18}$ alkyl, $C_6$-$C_{24}$ aryl, $C_7$-$C_{34}$ arylalkyl, $C_1$-$C_{18}$ alkoxyl, $C_1$-$C_{12}$ ($C_1$-$C_9$ alkoxysilyl)alkyl, and $C_2$-$C_{18}$ alkenyl, such as from H, $C_2$-$C_{12}$ alkyl, $C_6$-$C_{12}$ aryl, $C_7$-$C_{22}$ arylalkyl and $C_2$-$C_{12}$ alkoxyl, $C_2$-$C_8$ ($C_1$-$C_6$ alkoxysilyl)alkyl, and $C_4$-$C_{12}$ alkenyl, preferably from H, $C_1$-$C_6$ alkyl (such as methyl, ethyl, propyl, butyl, isobutyl, pentyl, hexyl, cyclohexyl), phenyl, $C_7$-$C_{18}$ arylalkyl, $C_1$-$C_6$ alkoxyl, $C_1$-$C_6$ ($C_1$-$C_4$ alkoxysilyl) alkyl, and $C_1$-$C_6$ alkenyl. The alkyl, arylalkyl, alkoxyl, alkoxysilyl, and alkenyl groups may be linear and/or branched. The alkyl, arylalkyl, alkoxyl, alkoxysilyl, and alkenyl groups may be cyclic. The R groups may all be the same, or one, two or more, or all the R groups may be different from the other R groups.

Advantageously, an alkenyl group or alkoxysilyl group may be able to react post-coating to bind covalently to the coating. Such bonding may prevent leaching of non-bound components, such as a salt. However, the number of such groups should not be too high; it should be limited to maximum five, such as maximum three. The presence of terminal methyl groups anywhere in the POSS, such as in highly branched alkyl groups, may result in a coating having favourable anti-soiling properties.

The POSS useful for the invention comprises at least one group that can react, with polysilazane (bind covalently to Si) to cause fragmentation. Unsaturated bonds such as C=O and S=O are not usually thought of as nucleophiles, but both can act as nucleophiles in some circumstances. The authors have found out that carbonyl in butyl acetate and S=O in dimethyl sulfoxide react with polysilazane in our coating formulation. Therefore, nucleophilic groups is used in this invention in a broad sense to include unsaturated bonds capable of reacting with polysilazane to cause fragmentation. The nucleophilic group comprises a heteroatom selected from O, N, and S. The nucleophilic group may be selected from the group comprising C=O, OH, $NH_2$, NH, S=O, SH, C=N, and C≡N. In some embodiments, the nucleophilic group is selected from $NH_2$, C=O, and OH. The nucleophilic group may be present as a substituent on an R group, or it may be directly bonded to a Si atom. In some embodiments, the POSS comprises 1-8, preferably 1-5, more preferably 1-3 nucleophilic groups.

The Si atoms in polysilazane (Si—H, and possibly also Si—NH—Si) are easy targets for nucleophilic attacks. Hence, the nucleophilic group of a POSS molecule may react with polysilazanes in a coating composition. A possible mechanism is nucleophilic attack by the nucleophilic group of the POSS to form an intermediate dative covalent bond with the Si atom, making Si penta-coordinated, followed by bond breakage, which—in the case of a Si—N bond being broken-leads to fragmentation of the polysilazane chain. The extent of fragmentation may depend on the type of nucleophile, the type of polysilazane, and/or concentration.

POSS molecules may be of the open cage or of closed cage type or of a random structure or of a ladder-like structure. Closed cage POSS molecules of various cage sizes, such as a T8 cage (8 Si atoms, structure III), a T10 cage, a T12 cage, and mixtures of any two or more, may be particularly useful in the coating compositions of the invention.

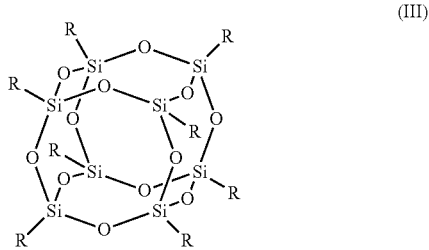

(III)

Advantageously, the POSS further comprises at least one fluoro substituent. The fluoro substituent may be directly bonded to a Si atom. Advantageously, the fluoro substituent is present as a substituent on an R group, making the R group a fluorinated R group. In some embodiments, the fluorinated R group is based on a siloxane, such as a (poly)siloxane. Preferred POSS molecules comprise at least one group selected from fluoroalkyl, fluoroaryl, fluoroarylalkyl, fluoroalkoxyl, fluoroalkoxysilyl, or fluoroalkenyl, as an R group. In some embodiments, the R groups are selected from $C_1$-$C_{18}$ fluoroalkyl, $C_6$-$C_{24}$ fluoroaryl, $C_7$-$C_{34}$ fluoroarylalkyl, $C_1$-$C_{18}$ fluoroalkoxyl, $C_1$-$C_{12}$ fluoro($C_1$-$C_9$ alkoxysilyl) alkyl, and $C_2$-$C_{18}$ fluoroalkenyl, such as from $C_2$-$C_{12}$ fluoroalkyl, $C_6$-$C_{12}$ fluoroaryl, $C_7$-$C_{22}$ fluoroarylalkyl and $C_2$-$C_{12}$ fluoroalkoxyl, $C_2$-$C_8$ fluoro($C_1$-$C_6$ alkoxysilyl)alkyl, and $C_4$-$C_{12}$ fluoroalkenyl, such as from $C_1$-$C_6$ fluoroalkyl (such as fluoromethyl, nonafluorohexyl, fluoroethyl, trifluoropropyl, pentafluorobutyl, isofluorobutyl, heptafluoropentyl, cyclofluorohexyl), pentafluorophenyl, $C_7$-$C_{18}$ fluoroarylalkyl, $C_1$-$C_6$ fluoroalkoxyl, $C_1$-$C_6$ fluoro($C_1$-$C_4$ alkoxysilyl) alkyl, and $C_1$-$C_6$ fluoroalkenyl. The alkyl, arylalkyl, alkoxyl, alkoxysilyl, and alkenyl groups may be linear and/or branched. The alkyl, arylalkyl, alkoxyl, alkoxysilyl, and alkenyl groups may be cyclic. The R groups may all be the same, or one, two or more, or all the R groups may be different from the other R groups. For all of the mentioned fluorinated R groups, the fluorinated R group may comprise one or more fluoro substituents, such as 1, 2, 3, 4, 5, 6, 7 or more fluorine substituents. In preferred embodiments, the POSS comprises at least one $C_1$-$C_{10}$ fluoroalkyl group bearing 1-15 fluorine substituents, as an R group.

In some embodiments, the POSS does not comprise a fluoro substituent. In particular embodiments, the POSS comprises 5-7 R groups that are non-fluorinated and comprise aryl, such as phenyl, and/or alkyl, such as methyl, and/or (poly)siloxane, and 1-3 R groups that are non-fluorinated and comprise one or more nucleophilic groups selected from the group comprising or consisting of C=O, OH, NH2, NH, S=O, SH, C=N, or C≡N.

POSS molecules comprising fluoro substituents may give improved anti-soiling effects of the resulting coatings compared to POSS without fluoro substituents. POSS molecules comprising fluoro substituents may reduce the refractive index of the resulting coatings compared to POSS without fluoro substituents. Further, as shown in the Examples below using CO-POSS, fluorinated POSS may also give rise to a lower coefficient of friction.

The 8, 10 or 12 Si centres of T8, T10, T12 cage POSS make it possible to optimise surface chemistry of a coating composition and resulting coating. For example, if low surface energy (anti-soiling property) and low friction coefficient are needed, the majority of the centres can bear fluoroalkyl groups while only one or two bear a reactive nucleophilic group. Advantageously, the POSS structures make it possible to enrich the surface of a coating with $CF_2$ and $CF_3$ groups without introducing too many reactive groups, unlike most common molecules where each fluoroalkyl chain or other chain of interest comes with its own reactive and/or functional group.

The POSS may further, or alternatively, comprise other substituents not mentioned above, such as at least one chloro substituent. The POSS molecules may comprise, as or in R groups, groups or substituents selected specifically for their properties, such as anti-pathogenic agents, UV absorbers/stabilizers, IR absorbers, and/or up-converting phosphors.

In some embodiments, a preferred POSS is CO-POSS. CO-POSS has isobutyl groups bound to all but one of the Si centres, and a mixture of propyl methacrylate and perfluorododecyl (—$CH_2CH_2(CF_2)_7CF_3$) on the last Si centre. This combination of R groups in CO-POSS results in a POSS having the positive properties associated with fluoro substituents and that is quite hydrophobic and able to form a stable solution with polysilazane, leading to a quite even distribution of the POSS in the polysilazane matrix, as observed by microscopy.

Further preferred POSS are POSS having a higher number of fluorinated R groups than CO-POSS, such as up to seven fluorinated groups, such as up to six fluorinated groups on a T8 POSS. The inclusion of these POSS molecules in the coating compositions of the invention is expected to give coatings having a low coefficient of friction and/or good anti-soiling/ease-of-cleaning properties relative to other comparable coatings. Examples of such preferred POSS are T8 POSS bearing fluorinated chains such as $CH_2CH_2(CF_2)$ $nCF_3$ wherein $0 \leq n \leq 8$, more preferably wherein $0 \leq n \leq 7$. POSS with larger cage sizes may have a correspondingly higher number of fluorinated chains. Shown below are some non-limiting examples of useful POSS (structures IV-VI).

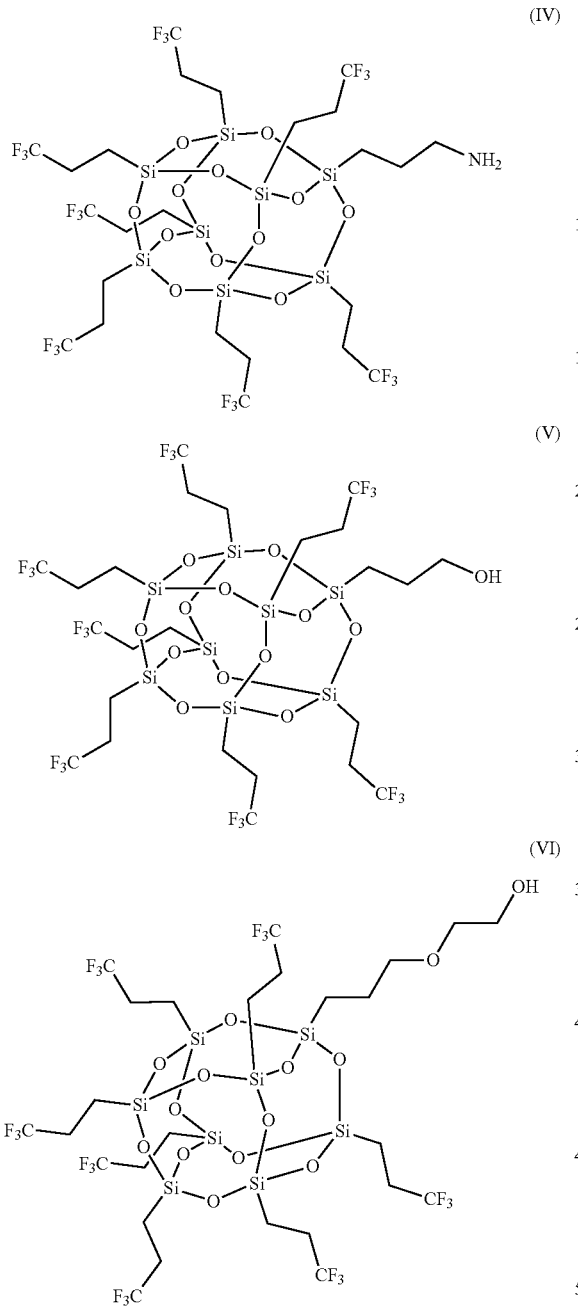

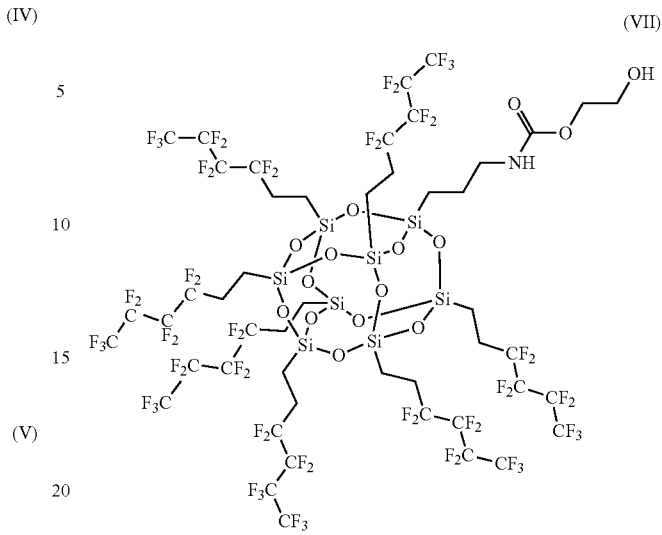

In some embodiments, a POSS may be used that bears fluorinated chains such as $(CF_2)_nCF_3$, wherein $0 \leq n \leq 8$ (assuming T8 cage). These POSS molecules may further optionally comprise more nucleophilic and/or polar functional groups. This may help improve solubility in solvent, especially with longer fluoroalkyl chain (e.g. $n \geq 3$). In these embodiments, the coating composition may comprise a fluorinated solvent to further improve solubility of such POSS, such as the only solvent, or such as in combination with another solvent. The skilled person is knowledgeable about various fluorinated solvents and of compatible solvents for solvent mixtures. Compound VII is an example of a useful POSS of such a structure.

All POSS molecules comprising fluoro substituents may further comprise any other type of fluorinated and/or non-fluorinated R groups, for example, but not limited to, straight-chained or branched alkyl, aryl (e.g. phenyl), (poly) siloxane, and alkoxysilyl (alkyl-O—Si). The combination of fluorinated and non-fluorinated substituents may help improve solubility of POSS, especially in non-fluorinated solvents. It may also reduce the tendency of fluorinated molecules, such as compounds comprising $CF_2$ and/or $CF_3$ groups, to stick together or phase separate, a phenomenon that can lead to high surface roughness, hazy coatings and even increase in friction coefficient. Alkoxysilyl, e.g methoxysilyl and ethoxysilyl, hydrolyse very fast in the presence of moisture to form silanols, which contributes towards fast curing of polysilazane. POSS molecules with only alkoxysilyl groups or a majority of alkoxy silyl groups may also be used, with or without one R group containing a reactive functional group.

Examples of POSS molecules with combination of fluorinated (trifluoropropyl) and non-fluorinated R (phenyl and isobutyl) groups used in the present invention include:

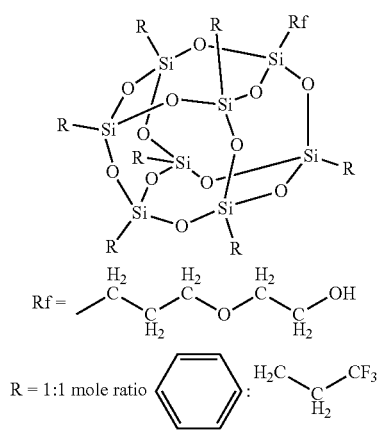

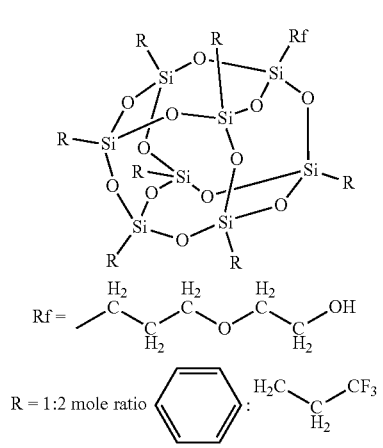

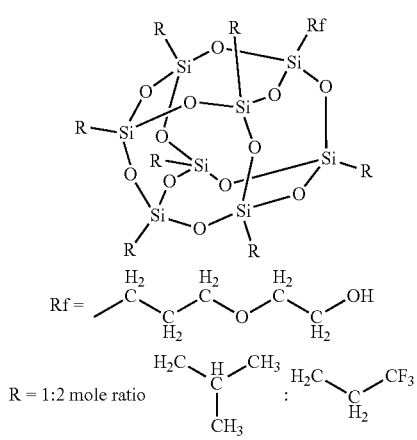

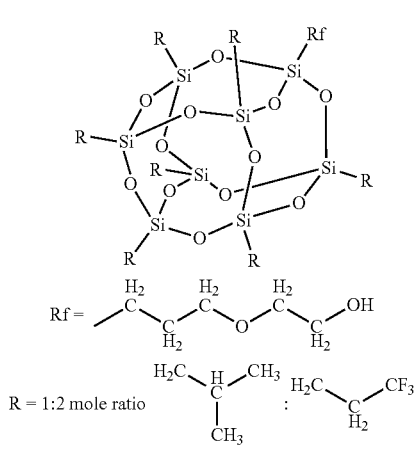

The authors have discovered that a combination of phenyl or alkyl (isobutyl, isooctyl, etc) with fluoroalkyl (triflouoropropyl, heptafluoropentyl, etc) led to POSS with better solubility in solvent and/or better dispersion in polymer matrix, eliminating coating haziness which was common for structures IV and V, as well as giving overall improved coating quality, e.g. based on visual observation. For example, structure VIII was tested up to 40 wt % with respect to the polysilazane concentration without showing haziness, unlike VI. The theoretical ratios shown in structures VII-XI are just exemplary as are combinations of R groups.

The inclusion of one or more phenyl groups in a POSS molecule used in a composition of the invention may increase toughness of the resulting coating, such as mechanical toughness, such as measured by tensile strength. Furthermore, it may improve resistance to damaging radiation, such as electron, proton and/or UV in space. Thus, in some embodiments, at least one R group comprises a phenyl group.

Further, it appears that if the POSS contains R groups which are naturally slippery, the resulting coating has a comparatively low coefficient of friction. Examples of such naturally slippery R groups are polyether, (poly)siloxane, and fluorinated chains.

Another POSS investigated by the inventors is N-POSS, wherein 3 of 8 R groups are 3-aminopropyl groups. A molecule of N-POSS, with 3 amino groups (assuming T8 cage), can react 3-6 times more with polysilazane than a molecule of POSS with only one OH or C=O group. Therefore N-POSS reacts more aggressively with polysilazane than does CO-POSS.

Furthermore, the POSS of the present invention may not be fluorinated, yet with R groups which are inert or contain inert groups. Examples of such inert groups include phenyl, alkyl, alkene, siloxane and ethers. Non-fluorinated POSS may have a combination of more than one R groups. Such combination, e.g phenyl and vinyl, alkyl and vinyl or alky and phenyl may improve dispersion and compatibility in solvent and the coating matrix. An example of non-fluorinated POSS includes aminopropyl isobutyl POSS (structure IV with trifluoropropyl replaced by isobutyl) and trisilanol isobutyl POSS (open cage). The latter was found to be too reactive, requiring reduction of the silanol concentration by reacting with appropriate silane to form silyl ether.

The POSS present in the composition of the invention typically has a T8 cage (8 Si atoms), a T10 cage, or a T12 cage, or a mixture of any two or more. POSS having a larger cage structure, such as T14 or T18, may also be useful in the coating composition of the invention. In some embodiments, T8 is preferred. In other embodiments, T10 and/or T12 is preferred, as they may offer a greater mechanical strength to coatings. Further, these may also lead to slightly higher nano porosity than their T8 counterparts, due to less close packing compared to the smaller T8. So-called dumbbell-shaped and/or star-shaped POSS may also be useful. In some embodiments, the POSS has a dumbbell shape wherein two POSS cages are linked together. In some embodiments, the POSS has the shape of an "extended dumbbell", wherein three, four or more POSS cages are linked together. Such structures may advantageously comprise only 1-3 nucleophilic groups, such as two nucleophilic groups, preferably a single nucleophilic group. The low number of nucleophilic groups per POSS structure may lead to a lower reactivity, thus increasing control over the reaction. The use of dumbbell-shaped POSS may improve the distribution of POSS cages throughout the composition, such as by giving a more uniform distribution of POSS cages in the composition. This effect may lead to improved light transmittance of a resulting coating. Shown below are examples of useful POSS having a dumbbell shape.

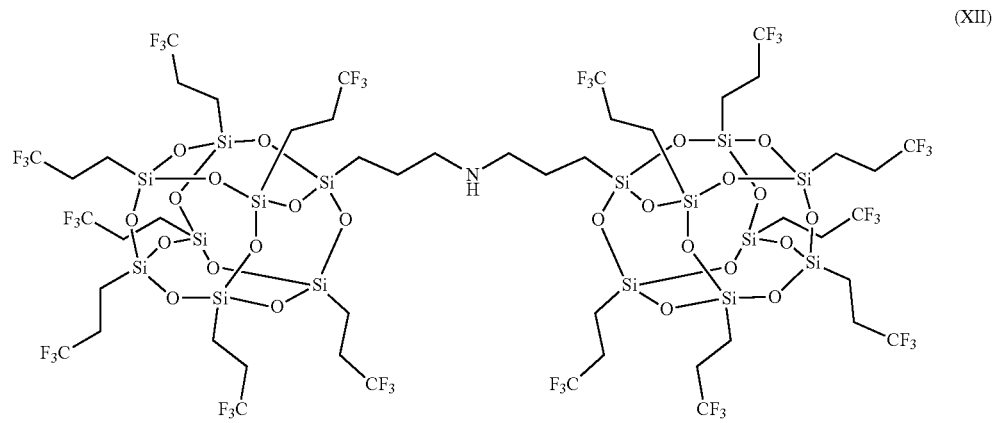
(XII)
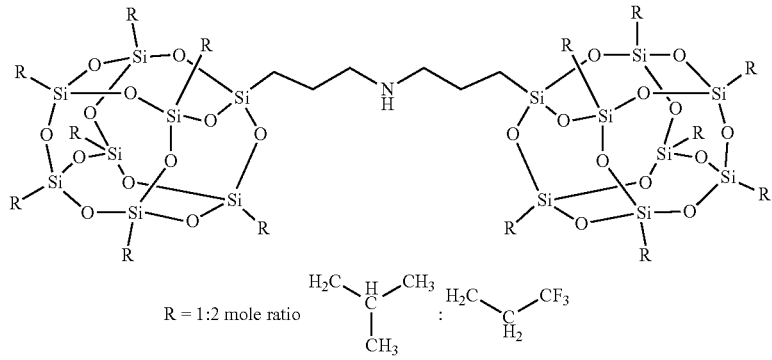
(XIII)
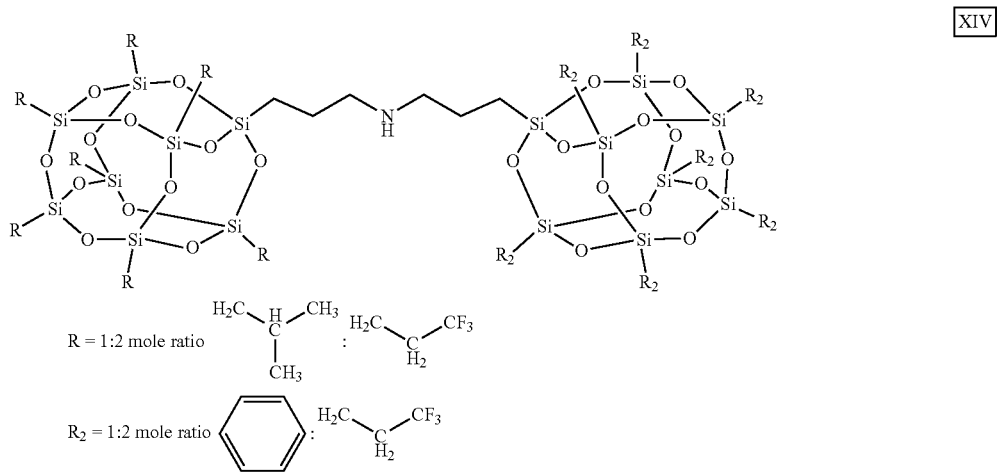
(XIV)
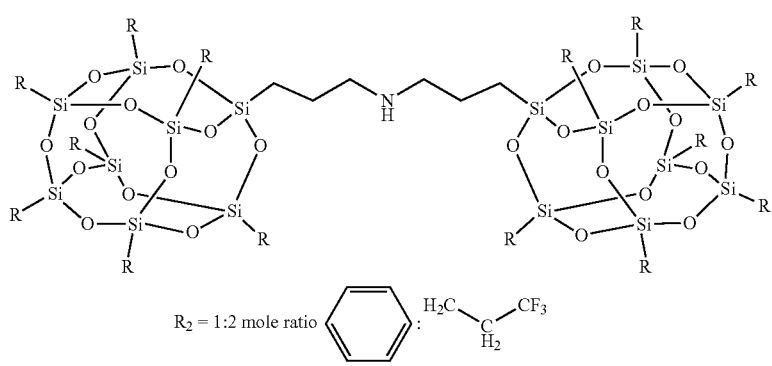
(XV)

The dumbbell structures all have a secondary amine as the reactive nucleophlile due to the synthetic approach adopted. Other nucleophiles may be used. Furthermore, the ratios of R groups are exemplary. The R group(s) on one ball of a dumbbell structure may be different from those on the other ball The POSS is present in the coating composition of the invention in an amount of 0.1-15 wt %, based on the weight of the coating composition, such as 0.2-15 wt %, such as 0.5-10 wt %, such as 1-5 wt %.

A combination of two or more POSS types may be used. For example, a POSS containing mainly fluorinated groups and one or two nucleophile-bearing R group may be combined with another POSS with alkoxysilyl and fluorinated R groups. A combination of different POSS structures (T8, T10, T12, open or close cages) may be used. The POSS structures VIII, IX and X were synthesised by a method designed to yield T8 structures and closed cage. However, upon analysis by nuclear magnetic resonance (NMR) it was found out that about 2 to 4 percent of the products were open cage for VIII and IX (combination of phenyl and trifluoropropyl) and about 9 percent open cage for X. Furthermore the ratios of trifluoropropyl to non-fluorinated R group were slightly different from theoretical values, with phenyl: trifluoropropyl POSS structures having a slightly higher trifluoropropyl content than the theoretical values and the opposite for isobutyl: trifluoropropyl combination. These variations in structures and R group naturally apply to their derivative dumbbell structures.

In some embodiments, the composition of the invention further comprises 0.005-5 wt %, such as 0.05-5 wt %, such as 1-3 wt % based on the total weight of the composition, of a POSS comprising no reactive nucleophilic group.

The composition of the invention comprises of a compound able to promote reaction of the polysilazane component with the POSS and/or cause defragmentation of polysilazane. The compound comprises a nucleophilic component, such as an anion. Preferably, the compound is a salt. More preferably, the salt is a quaternary ammonium salt $R^1R^2R^3R^4N^+X^-$. As used herein, the term "quaternary ammonium salt" refers to a univalently positively charged group $R^1R^2R^3R^4$ with a tetravalent nitrogen and a negative counterion (the anion). The anion, $X^-$, may be selected from fluoride, chloride, bromide, and iodide. Alternatively, $X^-$ may be a polyatomic anion such as $PF_6^-$ or $BF_4^-$ or $OH^-$. In some embodiments, X is selected from F, Cl, Br, I, $PF_6$ or $BF_4$ and OH. In some embodiments, X is selected from F, Cl, and Br. Each of $R^1$, $R^2$, $R^3$, and $R^4$ is independently selected from the group comprising or consisting of $C_1$-$C_{10}$ alkyl, aryl, arylalkyl, alkoxysilyl, and alkenyl. Advantageously, the alkoxysilyl group of an alkoxysilyl is able to hydrolyse to a silanol, which can undergo polycondensation with other silanols from polysilazane hydrolysis to give a covalent bond post coating. Other groups that can react with polysilazane or an additive post coating in order to establish covalent bonds, such as alkenyl groups having activated C=C double bonds, are also advantageous.

The salt may promote reaction of nucleophilic groups on POSS, and/or other components of the coating composition, with polysilazanes. This activation may be the result of an interaction of $X^-$ with a silicon atom of the polysilazane, such as a coordination, resulting in activation of the silicon atom for nucleophilic attack.

The salt may also act as a catalyst for defragmentation. As discussed above, the presence of nucleophilic (reactive) centres in POSS in the coating composition leads to fragmentation of polysilazane chains. Fragmentation may start immediately upon mixing the polysilazane component and the POSS. Resulting fragments may be volatile, less reactive than the original polysilazane, or even unreactive. Due to their smaller size, they may be lost to evaporation. They may also leave behind in the cured coating unreacted polar groups, decreasing the anti-soiling properties of the coating.

Although not wishing to be bound by any theory relating to their mechanism of action, a possible explanation for the observed positive effects of the presence of a quaternary ammonium salt discussed below in the Experiments, may relate to the fact that the polysilazane fragments comprise $NH_2$ and NH functional units, and that the quaternary ammonium salts may promote reaction of electrophilic Si atoms in Si—H with nucleophiles such as $NH_2$ and NH. These properties may allow re-incorporation of fragments into the larger polymeric network. Importantly, the anion of the salt is a stronger nucleophile than the reacting nucleophile ($NH_2$ and NH), and able to catalyze a reaction that may described as

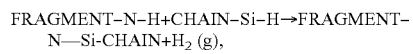
FRAGMENT–N–H+CHAIN–Si–H→FRAGMENT–N—Si-CHAIN+$H_2$ (g), wherein CHAIN denotes the chain of a polysilazane polymer backbone. The observation of bubbling (i.e. evolved gas) upon mixing polysilazane and catalyst supports this theory. If two different polymer backbones are linked together-which may also take place—the phenomenon is referred to as solution cross-linking. Solution cross-linking can take place in the absence of POSS (or polysilazane fragments), since the NH group of polysilazane (Si—NH—Si) can react with Si—H in the presence of the catalyst, leading to formation of Si—N bond Preferred quaternary ammonium salts are the commercially available tetra-n-butylammonium fluoride (TBAF), tetra-n-butylammonium bromide (TBAB), tetra-n-butylammonium chloride (TBAC), and tetra-n-butylammonium hydroxide.

The salt may be present in the coating composition in an amount of 0.0001-2 wt %, based on the weight of the composition, such as 0.001-1 wt %, such as 0.1-0.5 wt %.

The composition of the invention may comprise a curing agent. As used herein, the term "curing agent" refers to any compound known by the skilled person to promote curing of polymers by cross-linking of polymer chains. Examples of preferred curing agents are 3-aminopropyltriethoxysilane (APTES), tetraethylorthosilicate (TEOS), alkylltriethoxy silane (e.g ethyltriethoxy silane) and alkyltrimethoxysilane. APTES is able to react with polysilazane because of its amino group, and can thus be seen as a reactive additive, which implies that the use of a defragmenting catalyst may be needed. The alkoxysilyl groups, being less sterically hindered, are able to undergo fast hydrolysis which leads to formation of silanols, and therefore enhance the curing of polysilazane. The curing agent may be grafted on the polymer chain, as seen in D1500 RC The curing agent may be present in the coating composition in an amount of 1-30 wt %, based on the weight of the polysilazane component, such as 3-30 wt %, such as 3-10 wt %, such as 10-20 wt %.

The composition of the invention comprises an inert solvent. The term "solvent" as used herein refers to a liquid substance in which a compound is soluble or partially soluble enough at a given concentration to dissolve or partially dissolve the compound. The term refers both to solvent blends (i.e., solvents consisting of a plurality of constituents) and to pure compounds (i.e., solvents consisting of a single constituent) unless the context indicates otherwise. As used herein, the term "inert solvent" means a solvent that is known by the skilled person not to react with other components of the coating composition. The solvent should be present in an amount of 20-99 wt % based on the total weight of the composition. The solvent may be selected from the list comprising or consisting of tetrahydrofuran (THF), 2-methyl tetrahydrofuran (MTHF) dibutyl ether (DBE), methoxyperfluorobutane (MPB), cyclopentyl methyl ether, aromatic solvents such as xylene and toluene, and other polar aprotic and non-polar solvents which do not comprise functional groups that may react with polysilazane. It is typically an ether or a hydrocarbon. In some embodiments, the solvent is selected from the list comprising or consisting of THF, DBE, MTHF, MPB and xylene. THF, MTHF and dibutyl ether are examples of preferred solvents. The solvents DMSO and butyl acetate may react with polysilazanes in the presence of TBAF or other catalysts, and should thus preferably be avoided, as should other solvents containing unsaturated bonds involving heteroatoms, since TBAF and other quaternary ammonium fluorides or catalysts can enhance reaction of such double or triple bonds with Si—H.

In some embodiments, the composition of the invention further comprises one or more components selected from the group comprising or consisting of flow levelling agents, photoinitiators, fibres, polymer stabilisers, fillers, and pigments.

The composition of the invention may further comprise a flow levelling agent. As used herein, the term "flow levelling agent" refers to one or more compounds known by the skilled person to be able to enhance the uniformity of a coating and eliminate defects such as pinholes, "fish eyes", "orange peel", high roughness etc. The flow levelling agent may be present in an amount of 0.01-1.5 wt %, such as 0.1-0.8 wt %, such as 0.3-0.5 wt %, based on the weight of the coating composition. The flow levelling agent may not have a reactive nucleophilic group selected from the group of C=O, OH, $NH_2$, NH, S=O, SH, C=N, or C≡N. One example of a flow levelling agent is the polyether siloxane copolymer commercially available as "TEGO® Glide 410" (TG4). In some embodiments, a levelling agent comprising an organofluorine group is preferred, such as to achieve a coating formulation with a lower surface tension, especially when additives or polysilazane contain fluoro substituents are used. Non-limiting examples of a levelling agent with organofluorine group are derivatives of the levelling agent reported in U.S. Pat. No. 20110319581A1, with the structure shown below (structure XVII):

an, alkyl group or acyl group containing 1 to 6 carbon atoms; $R^1$ and $R^2$ are independently an alkyl group, aryl group, or an aralkyl group containing 1 to 10 carbon atoms.

The composition of the invention may further comprise a photoinitiator, such as 1-hydroxycyclohexylphenyl ketone. A photoinitiator may further aid curing of coatings, when curing is aided by UV or visible light. The photoinitiator may be present in an amount of 0.05-5 wt %, such as 0.1-4 wt %, such as 0.3-1 wt %, based on the weight of the coating composition.

The composition of the invention may further comprise a fibre, such as a nanofibre, such as a cellulose nanofibre. The fibre may bear one or more alkyl and/or fluoroalkyl groups as well as group containing a nucleophile which is capable of covalently bonding to polysilazane. The inclusion of fibres may reduce the refractive index of the resulting coating, such as through formation of air pockets in the coating. Fibres may also improve mechanical properties of the coating, such as impact toughness and tensile strength. The fibre may be present in an amount of 0.01-10 wt %, such as 0.1-7 wt %, such as 1-3 wt % based on the weight of the composition.

The composition may further contain one or more straight, branched or cyclic (poly)siloxane. An example is 1,3,5,7-tetramethylcyclotetrasiloxane shown below (structure XVIII).

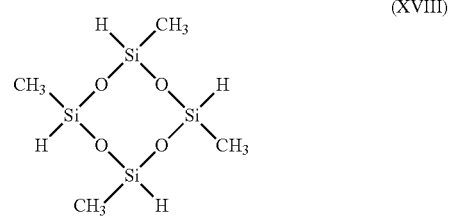

(XVIII)

Modifications of structure X in which one or more hydrogen atoms is/are replaced by alkyl, aryl, (poly)siloxane, organofluoro such as e.g fluoroalkyl, a reactive group such as 3-aminopropyl or 6-hydroxyhexyl, and/or an alkoxysilyl group may be preferred. The mentioned groups may have similar functions as if present in a polysilazane and/or a POSS, for example the reactive group can bind covalently to polysilazane; the inert organic and organofluoro groups may improve coating formulation stability as well as anti-soiling property of resultant coatings; the alkoxysilyl groups may

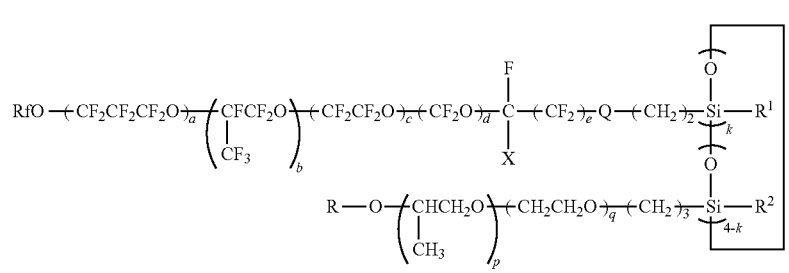

(XVII)

The flow levelling agent should not react with polysilazane, therefore, in structure XVII, Rf may represent a straight chain or branched perfluoroalkyl group containing 1 to 10 carbon atoms; X a represents trifluoromethyl group: Q may represent an ether containing 1 to 12 carbon atoms; R enhance curing of polysilazane. (Poly)siloxane-based additives may be present in the coating formulation in an amount of 0.05-15 wt %, such as 0.08-10 wt %, such as 1-3 wt %, based on the weight of the composition. A particular advantage of (poly)siloxane-based additives is that they may not be as crystalline and rigid as POSS, and therefore may improve the flexibility of the resultant coatings. Other advantages may include improvement in light transmittance.

The composition of the invention may further comprise a polymer stabiliser. As used herein, the term "polymer stabiliser" refers to any chemical compound or composition that may inhibit or retard any degradation of the polysilazane component and/or the coating. Common polymer degradation processes include oxidation, UV-damage, thermal degradation, ozonolysis, combinations thereof such as photo-oxidation, as well as reactions with catalyst residues, dyes, or impurities. The polymer stabiliser may be selected from the group comprising or consisting of antioxidants such as radical scavengers, hydroperoxide scavengers, antiozonants; light stabilisers such as UV stabilisers, quenchers, hindered amine light stabilisers; acid scavengers; metal deactivators; heat stabilisers; flame retardants; biocides; and any combination thereof. Preferably, the polymer stabiliser is a UV stabiliser, i.e. a compound or composition that prevents photodegradation of the polysilazane component or the coating, such as by absorbing UV radiation.

The coating composition may further comprise one or more further fillers and/or pigments, for example, wollastonite, carbon black, micaceous iron oxide, and/or a thixotrope.

The composition of the invention may be coated onto a substrate and cured in order to obtain a coating. Thus, in another aspect, the invention relates to the use of any of the compositions disclosed herein, for coating a substrate.

In yet another aspect, the invention relates to a substrate comprising a coating, wherein the coating is made at least in part from any of the compositions disclosed herein. In some embodiments, the coating is made from a composition disclosed herein.

The substrate may be made of any material. For materials with low surface energy (high water contact angle), surface activation prior to coating may be necessary. Such activation typically comprises creating nucleophilic functional groups which will promote wettability, such as by coating the coating composition, and covalent bonding of a coating to the substrate, and can be accomplished e.g. by means of atmospheric plasma, UV or chemical treatment. Atmospheric plasma treatment may be preferred because it may be faster and safer. For example, the surface of polyethylene may be treated with atmospheric plasma for less than 30 seconds to create functional groups such as hydroxyl, carbonyl, and carboxyl. Other substrates, such as glass, may also be treated to increase the concentration of nucleophilic functional groups and hence improve wettability and coating adhesion. These nucleophilic groups can covalently bind to polysilazane through the Si—H, leading to strong coating adhesion. When the substrate is glass, covalent bonding can also be established based on reaction between silanol on the glass surface and silanol generated by hydrolysis of polysilazane, leading to Si—O—Si bond. Atmospheric plasma activation of glass may increase the concentration of surface silanol groups, and thus, lead to stronger coating adhesion.

The coating method disclosed in the Norwegian patent application Ser. No. 20/200,778 or any patent or patent application resulting therefrom or claiming priority therefrom, may be used for the preparation and/or application of the coating composition. Hence, a polysilazane coating method for limiting fragmentation of polysilazane may be used that comprises the steps of i) preparing a coating composition, wherein the preparation of the coating composition comprises the sub-steps of
   a. introducing a component A into a coating composition vessel;
   b. introducing a component B into the coating composition vessel and mixing component B with component A; and
   c. introducing a component C into the coating composition vessel and mixing component C with components A and B;
wherein the components A, B, and C each are chosen from a group of polysilazanes, a group of quaternary ammonium salts, or a group of reactive nanomaterials and/or reactive molecules that can react spontaneously with a polysilazane polymer backbone to cause fragmentation, such as POSS, wherein the components A, B, and C are all chosen from different groups;
wherein the choice of group for each of the components A, B and C are predetermined based on the known reactivity of the components towards each other;
  ii) applying the coating composition to a substrate; wherein step ii) is initiated at a predetermined time period ti based on the known reactivity of the components towards each other.

the predetermined time period $t_{ii}$ may be chosen so that $1 \leq t_{ii} \leq 1200$ seconds.

The introduction of component C in sub-step ic) is initiated a predetermined time period $t_c$ after the introduction of component B in sub-step ib); and wherein $t_c$ is chosen so that $0 \leq t_c < 900$ seconds.

Alternatively, two or more of the components, such as all of the components, of the coating composition may be mixed together simultaneously, meaning that $t_c=0$, before applying the coating composition to the substrate, wherein the application of the coating composition to the substrate is initiated a predetermined time period ti 1-1200 seconds after said mixing, and wherein ti is predetermined based on the known reactivity of the components towards each other.

In some embodiments, the polysilazane is mixed with any additives that do not react with polysilazane (e.g TG4), and the reactive additives (e.g. POSS) and the quaternary ammonium salt are mixed together separately. Other additives such as anti-bacterial agents, UV stabilisers, etc. may be added to the solution containing polysilazane or that containing POSS, depending on their compatibility with the content of such solutions. The two mixtures are combined and mixed. The application of the coating composition to the substrate may then be initiated a predetermined time period $t_{ii}$, such as 1-1200 seconds, after mixing of the two mixtures.

In some embodiments, the polysilazane is mixed with any additives that do not react with polysilazane (solution A), and the reactive additives (e.g. POSS) and the quaternary ammonium salt are mixed together separately (solution B) while a third mixture contains additives which can react with polysilazane, e.g UV absorbers, photoinitiators, radical curing agents, anti-bacterial agents, etc (solution C). A and B are first mixed together and C is introduced 1-1000 seconds afterwards. The application of the coating composition to the substrate may then be initiated a predetermined time period $t_{ii}$, such as 1-1200 seconds, after mixing of A and B. The definition of reactive additive may be relative to concentration and type of such additive. A reactive component may be present in a such a small amount, for example as impurity or part of an additive, but with no significant fragmentation effect on polysilazane. It may then be combined with polysilazane in solution A"

The duration of solution C in the coating formulation before coating application (that is the time from introduction of solution C to application, by spray coating) may be chosen such that there is enough time to uniformly mix its content in the coating formulation. but short enough to limit the reaction of its content(s) with polysilazane. This is to ensure they remain active (e.g as UV absorber) since the activities of this set of additives are tied to the presence of functional groups on them, e,g hydroxyl, carbonyl. Such functional groups being reactive to polysilazane. To further reduce the chances of reaction between components of solution C and polysilazane, the solution may be diluted, e.g by adding the appropriate amount of solvent in solution C or by diluting the mixture of A and B prior to introduction of solution C.

The coating formulation may be diluted prior to coating, with or without further reactive component (solution C).

Other coating methods, mixing methods, and/or preparation methods known to the person skilled in the art may also be used.

The coating composition may be applied to a substrate using any technique known to the skilled person, such as by a method selected from the list comprising but not limited to, spraying; such as ultrasonic spray coating, such as spray painting, such as pneumatic spraying; spin coating; die casting; inkjet printing; doctor-blade, electrospinning, and other processes known in the art for transforming solution processed chemical compositions into coatings or membranes. An advantage of using spray application is that a more dilute coating composition may be used, leading to thinner films.

The thickness of an applied coating is typically in the range from 0.1 to 10 μm.

Curing may be aided by one or more of plasma, heat, and UV or visible light, all in the presence of vapour of water and/or ammonia and/or $H_2O_2$. UV and plasma curing are fast due to the presence of radicals, for example hydroxyl radicals and ozone, or excited molecules, e.g of water. These energetic molecules may cause rapid hydrolysis to form Si—OH and further may impact their energy on the silanols for faster polycondensation. When exposed to moisture, the Si—H and Si—NH—Si groups undergo hydrolysis to yield silanols, which then are cross-linked to yield Si—O—Si bonds. These reactions can also be enhanced with a curing agent which get readily hydrolysed on exposure to air, e.g. APTES. Use of such curing agents is particularly important for organic polysilazanes since their reactivity is limited by steric hindrance. Alkoxy groups present in the polysilazane molecule may speed up hydrolysis and cross-linking.

Fast curing may enable roll-to-roll coating. Complete curing may enhance wear and/or abrasion resistance, and/or promote better anti-soiling character since all or most of the nucleophilic groups have been consumed. Fast curing may advantageously be obtained by use of atmospheric plasma and/or UV as a curing means, with an ambient that could be air (normal), nitrogen, forming gas, with an appropriate level of relative humidity (RH), such as RH greater than 30%, such as greater than 60%. Humidity in the ambient may also be tuned. Other preferred methods, which may give a reduced curing duration compared to curing at standard atmospheric conditions include infrared heating in humidified atmosphere.

The embodiments and features described in the context of one aspect, e.g. for the aspect directed to the composition, also apply to the other aspects of the invention, such as the use of the composition, such as the substrate comprising a coating.

The invention shall not be limited to the shown embodiments and examples. While various embodiments of the present disclosure are described herein, it will be obvious to those skilled in the art that such embodiments are provided by way of example only. Numerous modifications and changes to, and variations and substitutions of, the embodiments described herein will be apparent to those skilled in the art without departing from the disclosure. It is to be understood that various alternatives to the embodiments described herein can be employed in practicing the disclosure.

It is to be understood that every embodiment of the disclosure can optionally be combined with any one or more of the other embodiments described herein.

It is to be understood that each component, compound, or parameter disclosed herein is to be interpreted as being disclosed for use alone or in combination with one or more of each and every other component, compound, or parameter disclosed herein. It is further to be understood that each amount/value or range of amounts/values for each component, compound, or parameter disclosed herein is to be interpreted as also being disclosed in combination with each amount/value or range of amounts/values disclosed for any other component(s), compound(s), or parameter(s) disclosed herein, and that any combination of amounts/values or ranges of amounts/values for two or more component(s), compound(s), or parameter(s) disclosed herein are thus also disclosed in combination with each other for the purposes of this description. Any and all features described herein, and combinations of such features, are included within the scope of the present invention provided that the features are not mutually inconsistent.

It is to be understood that each lower limit of each range disclosed herein is to be interpreted as disclosed in combination with each upper limit of each range disclosed herein for the same component, compound, or parameter. Thus, a disclosure of two ranges is to be interpreted as a disclosure of four ranges derived by combining each lower limit of each range with each upper limit of each range. A disclosure of three ranges is to be interpreted as a disclosure of nine ranges derived by combining each lower limit of each range with each upper limit of each range, etc. Furthermore, specific amounts/values of a component, compound, or parameter disclosed in the description or an example is to be interpreted as a disclosure of either a lower or an upper limit of a range and thus can be combined with any other lower or upper limit or a range or specific amount/value for the same component, compound, or parameter disclosed elsewhere in the application to form a range for that component, compound, or parameter.

EXAMPLES

Coating Composition (Experiment 1):

TABLE 1

Coating compositions

| Sample | D1500 RC | D1500 SC | D1800 | PS total | TBAF | TG4 | THF | N-POSS | CO-POSS | PI | Roughness Ra, (nm) |
|---|---|---|---|---|---|---|---|---|---|---|---|
| 61 | 20 | 0 | 2 | 22 | 0 | 0 | 78 | 0 | 0 | 0 | N/A |
| 62 | 19 | 0 | 2 | 21 | 0 | 0.6 | 76 | 2 | 0 | 0 | 0.03 ± 0.01 |
| 46 | 21 | 0 | 0 | 21 | 0.03 | 0.6 | 76 | 2 | 0 | 0 | 0.15 ± 0.02 |
| 50 | 19 | 0 | 2 | 21 | 0.03 | 0.6 | 76 | 2 | 0 | 0 | 0.1 ± 0.02 |
| 48T | 19 | 0 | 2 | 21 | 0.03 | 0.6 | 75 | 0 | 2 | 0.4 | 0.05 ± 0.01 |
| 48T-2 | 19 | 0 | 2 | 21 | 0.03 | 0.6 | 75 | 0 | 2 | 0.4 | 0.02 ± 0.01 |
| 48T-40 | 19 | 0 | 2 | 21 | 0.03 | 0.6 | 75 | 0 | 2 | 0.4 | 0.04 ± 0.01 |
| 48R | 0 | 19 | 2 | 21 | 0.03 | 0.6 | 75 | 0 | 2 | 0.4 | 0.08 ± 0.04 |
| Glass (substrate) | 0 | 0 | 0 | 0 | 0 | 0 | 0 | 0 | 0 | 0 | 0.02 ± 0.01 |

In Table 1, PS refers to polysilazane; D1500, D1500 SC, and D1500 RC and TG4 are as defined above; and PI refers to the photoinitiator 1-hydroxycyclohexylphenyl ketone. The concentrations of D1500 RC may have been up to 30-40% lower than indicated in the table due to decomposition of the stock solution.

Methods
Preparation of Coating Compositions

The coating compositions were prepared by separately mixing the polysilazanes and—if present—the TG4 in one container and the other components (POSS, TBAF and PI) in another container, both containers further containing solvent (THF), and then combining and mixing the two mixtures for five minutes, unless otherwise indicated.

Coating

The coating compositions were applied to a glass substrate by drop casting and spreading with a glass rod.

Curing

Curing was accomplished by treatment with UV light (405 and 360 nm lamp) for 10 minutes followed by heating on a hot plate maintained at 150° C. for 50-60 minutes at relative humidity of ≥40%.

Surface Roughness

Surface roughness was measured with a surface profilometer Mitutoyo Surftest SJ 301. The reported roughness values, Ra (mean or average roughness), is the arithmetic average of the absolute values of the roughness profile coordinates.

Wear Test

The tribological investigation was done on a unidirectional Ball on Disc tribometer (Phoenix Tribology Ltd., Newbury, UK) where a stationary ball (Ø6 mm) was pressed against rotating coatings. Tests were done with a maximum Hertzian contact pressure of approx. 250 MPa using an alumina ball as counterpart and 20 MPa using Teflon ball as a counterpart. For each test, 120 cycles were performed (with a radius of 5 and 4 mm). The test duration was set to 1 min. Prior to each test the balls were ultrasonically cleaned in ethanol for ten minutes, subsequently rinsed with fresh ethanol and dried with pressurised air. The coatings were blown with air to remove presence of solid particles. The tested surfaces were inspected with optical microscopy to evaluate the damage of the coatings. Tests with higher contact pressures of 500 MPa (alumina ball) and 40 MPa (Teflon ball) were also carried out.

Permanent Marker Test

The permanent marker tests were used as a measure of anti-soiling characteristics, which is applicable to anti-fingerprint, anti-smudge, anti-graffiti, etc. Permanent marker was applied on the coatings, and the impact was observed. Anti-soiling effect was considered present when the markers formed beads (broken lines) or contracted significantly compared to on uncoated glass. 10-60 seconds later the permanent marker lines were wiped with a tissue to determine the ease of soiling removal. For uncoated glass, the marker could not be wiped off, only occasionally spreading at the edges (smudge formation) when a lot of force was applied during the wiping.

CoF Test

CoF of coating 48T-2 was measured using the tribometer described in Section 5 with stationary balls (Ø6 mm) made of Alumina or Teflon pressed against the rotating coatings. Tests were done initially with a 2N load exerting a maximum Hertzian contact pressure of approximately 500 MPa using an alumina ball as counterpart and 40 MPa using a Teflon ball as a counterpart. Herein, the terms "load" and "Hertzian contact pressure" are used interchangeably. Tests were subsequently undertaken with 1N load on coatings 48T-2 and 48T corresponding to maximum Hertzian contact pressure of 20 MPa (Teflon ball) and 250 MPa (alumina ball).

Results and Findings
Pure Polysilazane, N—POSS and TBAF

The coating of sample 61, which did not contain POSS, did not show any anti-soiling effect in the permanent marker test, indicating the limited anti-soiling of a pure polysilazane coating with no performance enhancing additive. Further, the marker was only slightly wiped off.

The coating of sample 62, which contains N-POSS, gave poorer results than 61, showing no anti-soiling effect, nor any indication of the permanent marker being wiped off. These observations can be explained by the reactive N-POSS producing a lot of polysilazane fragments, leading to unreacted polar groups (e.g $NH_2$, NH and Si—H) which led to strong binding of the marker to the coating. This shows the importance of the presence of a quaternary ammonium salt as discussed above. It should be noted that, by visual inspection, 62 appeared smooth, comparable in appearance to the smooth 48 coatings, and clearly much better than 46, 50 and 48R (below). However, it's surface roughness ranged from Ra 0.03±0.01 to as high as Ra 0.1±0.01 nm, indicating the effect of fragmentation. However, the upper limit of its surface roughness is similar to 50. Therefore, its limited/poor anti-soiling characteristics is not related to high surface roughness, because 50 exhibited a clear repellency to permanent marker and ease of wiping off.

In the coating composition of sample 50, larger particles were formed in solution compared to samples 61 and 62. A possible explanation for this observation is the fact that the composition of sample 50 contained TBAF; hence a certain level of solution cross-linking and defragmentation can be expected have taken place. Further, N—POSS is highly reactive, which may also affect the formation of precipitates. The presence of precipitates may be the cause of the high surface roughness of the coating. Interestingly, even though the coating of sample 50 showed a significantly higher surface roughness and poorer film quality than samples 61 and 62, it showed a clear repellence to permanent marker, which was easily wiped off.

The coating of sample 46 differs from sample 50 by the presence of polysilazane D1800 in addition to D1500 RC. This coating had an even higher surface roughness, but was still repellent to permanent marker, though less than that of 50. This further indicates that the non-existent repellency of the coating of sample 62 to permanent marker is not connected to surface roughness.

Addition of a photoinitiator to sample 50 or 46 type did not show any effect on surface roughness or permanent marker repellency. The intended role of the photoinitiator was to improve coating curing under UV, but further experiments have not shown any noticeable benefit. This may be connected to the fact that the photoinitiator itself can react with polysilazane through its carbonyl and/or hydroxyl groups, a process that could make it unresponsive to UV light. It may be that direct UV heating (thermal curing with or without moisture) is obscuring the effect of photo-curing effect of the photoinitiator.

CO-POSS

In these experiments, the highly reactive N-POSS was replaced by CO-POSS, which with its high amount of inert R groups represents a quite different type of POSS.

The coating of sample 48T, which mirrors sample 50 except for the choice of POSS, was observed by visual inspection to be smoother and of higher optical quality than 46 and 50, while also offering better anti-soiling/ease-of-cleaning characteristics than 50 in the permanent marker test. The 48 series were therefore studied in more detail for surface roughness, friction coefficient and wear resistance.

For sample 48T-2, the coating composition, which is identical to that of 48T, was coated onto the glass substrate after only two minutes of mixing. The resulting coating showed a very smooth coating surface, evidenced by a surface roughness Ra of 20±10 nm, similar to that of the bare glass substrate.

Figure 2:
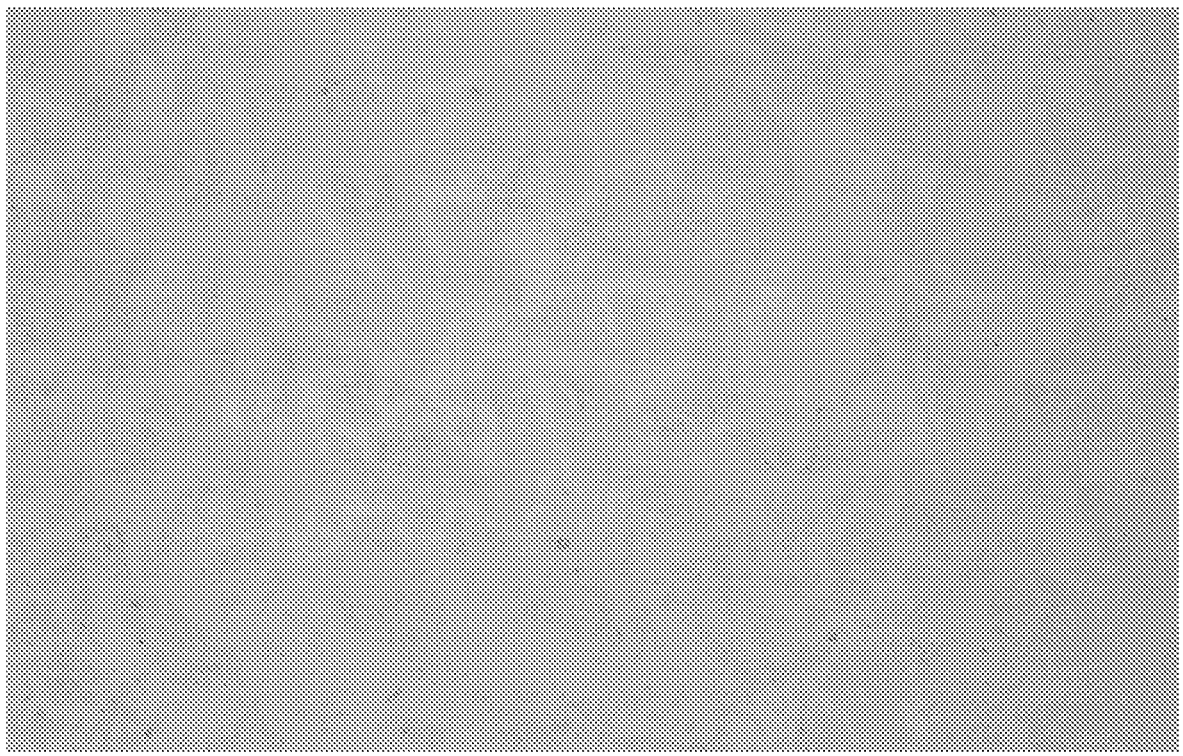
FIG. 2 shows a high magnification light microscope image of the coating of sample 48T.
Figure 3:
FIG. 3 shows a high magnification light microscope image of the coating of sample 48T-40.

In order to evaluate the effects of mixing time, a sample 48T-40 was prepared, again with the same coating composition as that of 48T, but with the composition coated onto the glass substrate after 40 minutes. FIGS. 1, 2, and 3 show high magnification light microscopy images of the coatings of samples 48T-2, 48T, and 48T-40, respectively. These show how for 48T, the coating consists of bigger dendrite-like particles, that are not apparent in 48T-2. For 48T-40, these dendrites have grown big enough to create inhomogeneity in optics (colour pattern) under the light microscope. By visual inspection, the coating of 48T-40 still looked transparent.

Figure 4:
FIG. 4 shows a light microscope image of the coating of sample 48T-2, showing tribological behaviour at applied load of 20 (to the left in the image) and 250 MPa (to the right in the image).
Figure 5:
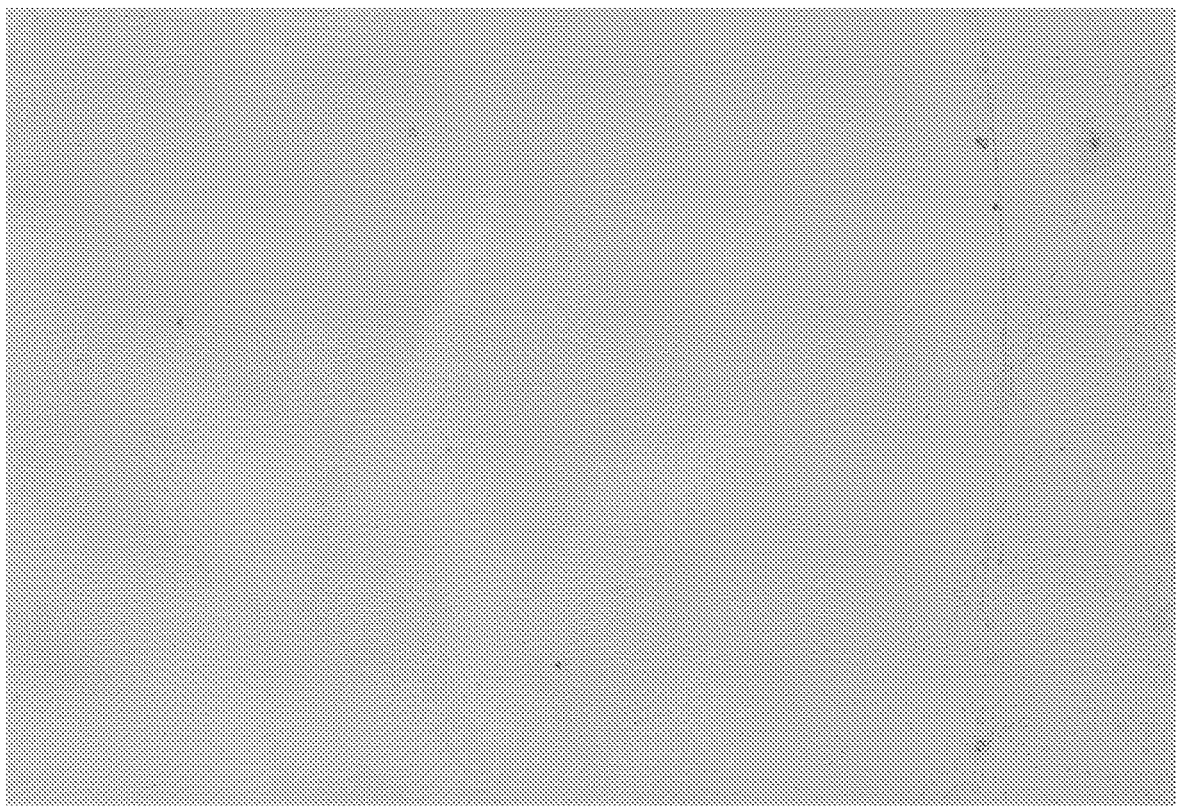
FIG. 5 shows a light microscope image of the coating of sample 48T, showing tribological behaviour at applied load of 20 (to the left in the image) and 250 MPa (to the right in the image).
Figure 6:
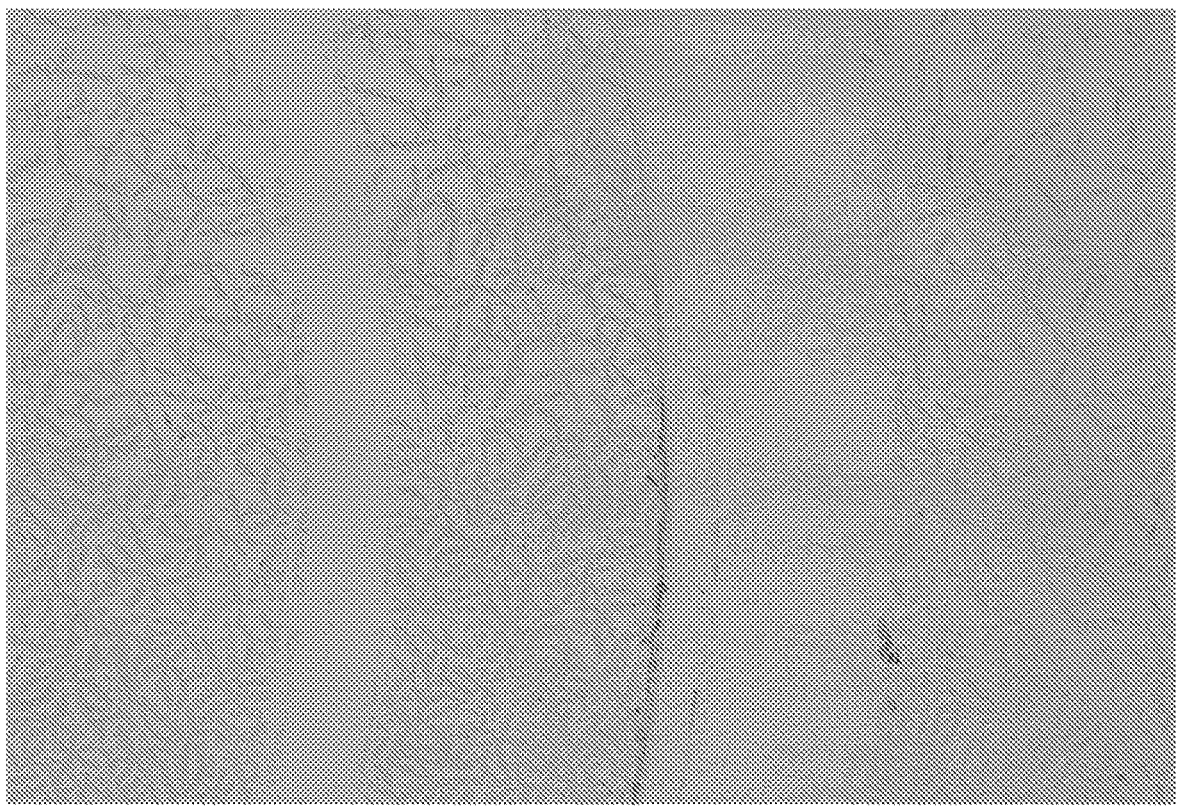
FIG. 6 shows a light microscope image of the coating of sample 48T-40, showing tribological behaviour at applied load of 20 (to the left in the image) and 250 MPa (to the right in the image).

In wear tests, the coating of sample 48-T2 showed a slight wear, which is understood to be only a polishing action under both 20 and 250 MPa. 48T showed no wear at 20 MPa but a slight wear (polishing) at 250 MPa. Under a Hertzian contact pressure of 20 and 250 MPa, 48T-40 was completely worn out, revealing bare glass, which indicates poor coating adhesion and curing. FIGS. 4, 5, and 6 show the tribological behaviour of the coatings of samples 48T-2, 48T, and 48T-40, respectively.

A possible explanation for the poor wear resistance of the coating of 48T-40 can be that too much solution cross-linking took place before application, resulting in a less ideal concentration of Si—H and Si—NH—Si functional groups. These groups are needed for post coating curing, and Si—H groups are also vital for covalent attachment to the glass substrate—or any other substrate with nucleophilic groups like hydroxyl, carbonyl, carboxyl, etc.

A reason for the better tribological properties of 48T compared to 48T-2 may be that solution cross-linking has resulting in higher molecular weight polysilazane, but not too high as in 48T-40. This hypothesis is supported by the higher surface roughness of 48T compared to 48T-2. Since 48T is expected to have fewer available functional groups than 48T-2, adhesion or curing is not expected to play a role. It can be argued that the concentration of functional groups in 48T-5 is sufficient for post coating curing and adhesion. This in turn indicates a balance between higher molecular weight polymer or polymer-POSS and post application processing, which is achieved with an optimum mixing time before application.

It should be noted that anti-fingerprint and anti-smudge coatings usually applied to glasses, such as smart screens, eyewear, solar panels, etc., are usually prepared from fluorinated polymer chains with silicon alkoxy or acrylate end groups for adhesion and curing. Typical applied load for wear tests is about 0.1 MPa (1 kg/cm$^2$) for example Shin-Etsu SUBELYN™ (perfluoropolyether with Si alkoxy end group) and Daikin chemicals OPTOOL DSX-E (fluoropolymer with Si alkoxy end group). There are also examples in the literature of lower applied loads. The much higher applied load for wear tests of the coatings made from the coating compositions according to the invention is indicative of a stronger and considerably more durable coating for anti-soiling applications.

A variant of 48T was prepared, named 48R, was also prepared, in which D1500 RC was replaced by the more "reactive" D1500 SC. D1500 SC shows higher solution reactivity than 1500 RC, which can be attributed to higher concentration of Si—H groups for same molecular weight. Upon coating application D1500 RC is more reactive (cures faster) due to higher concentration of APTES.

Figure 7:
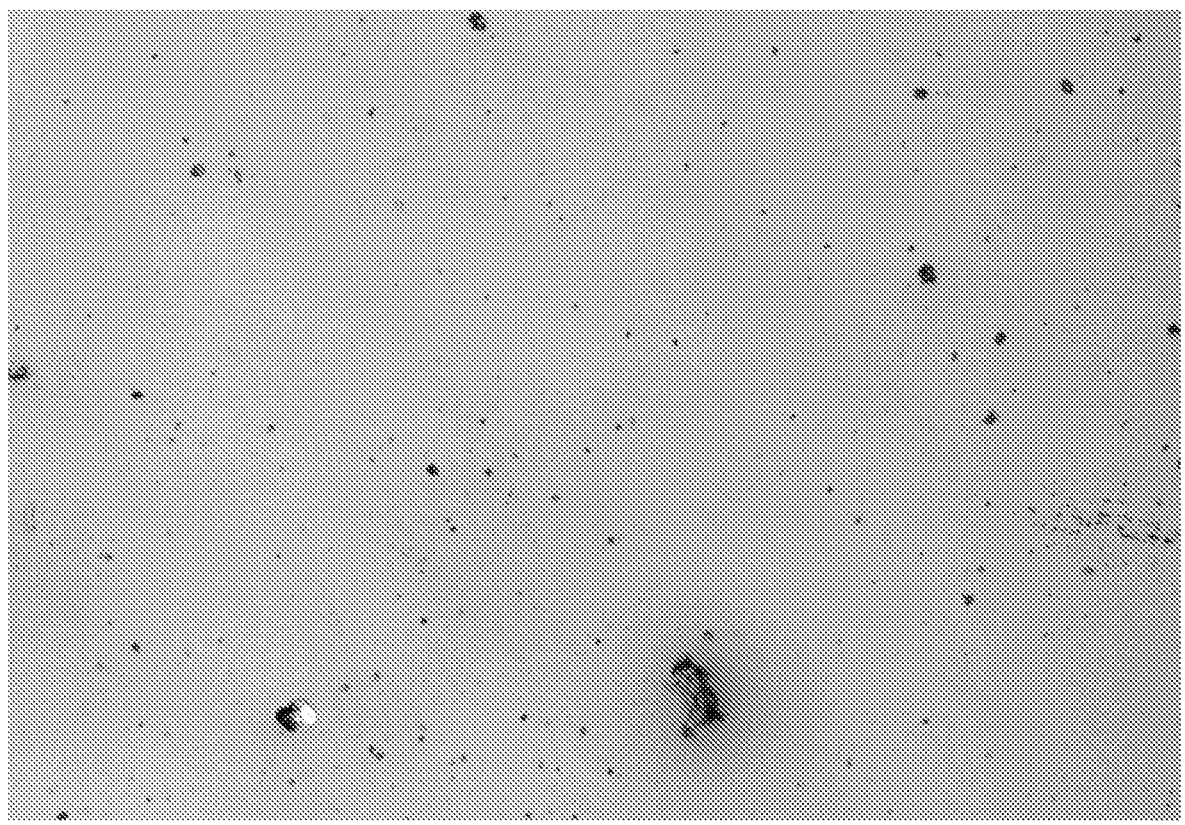
FIG. 7 shows a light microscope image of the coating of sample 48R, showing tribological behaviour at applied load of 20 (to the left in the image) and 250 MPa (to the right in the image).
Figure 8:
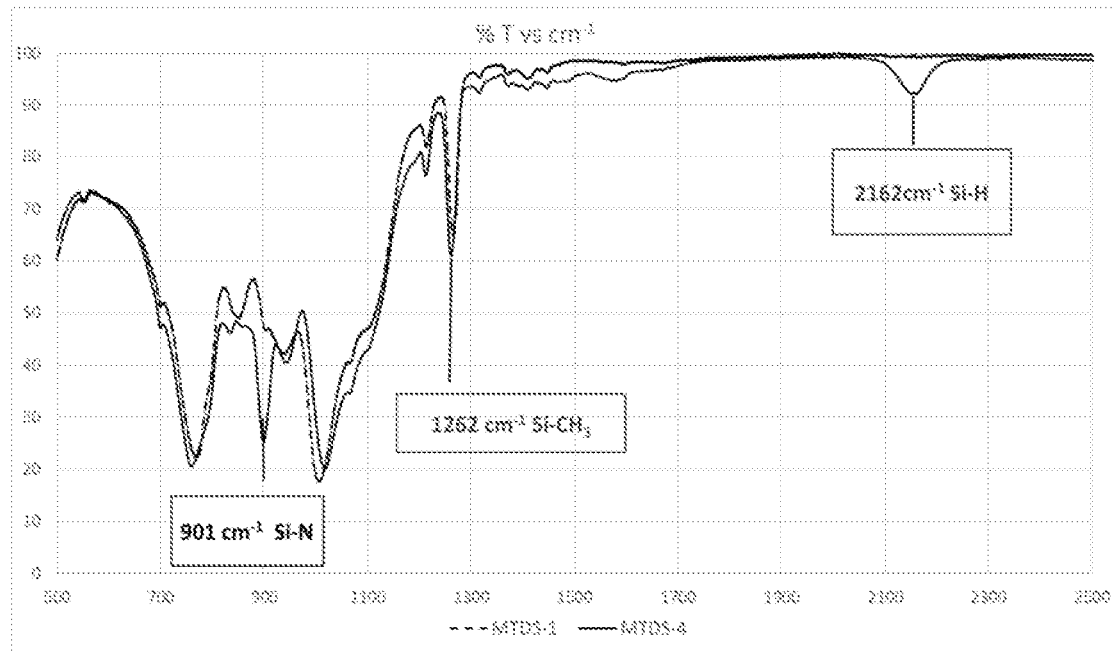
FIG. 8 shows FT-IR spectra of sample MTDS-1 which was cured in a high humidity atmosphere containing H2O2 vapour and one cured in ambient atmosphere

Even with the presence and stabilising effect of CO-POSS, the coating solution reactivity became as vigorous as that of 50 and other similar samples, leading to a coating consisting of a smooth surface with sprinkles of big and agglomerated particles as can be seen in FIG. 7. Though transparent and exhibiting anti-soiling characteristics (permanent marker adhesion and ease of wiping off) as good as the 48 series, the visible roughness of the coating makes it less useful for ecstatic application. Interestingly, sample 48R showed no sign of wear (polishing or deep wear) at 250 MPa.

Effect of Solvent

Some ready-to-use formulations of OPSZ brands are made with butyl acetate as the main or only solvent. Certain manufacturers also recommend the use of dibutyl ether for diluting PHPS. It is likely that butyl acetate will react with PHPS, explaining why it is not among the list of solvents recommended for PHPS. The authors have discovered that in the presence of TBAF, n-butyl acetate is reactive towards OPSZ in a coating composition, leading to a coating that was worn out completely at the 20 MPa Hertzian contact pressure. The presence of big particles and colour pattern seen in 48T-40 were also observed for the coating composition containing butyl acetate. This may be indicative of excessive consumption of Si—H functional groups by the carbonyl groups of the solvent, a process enhanced by the catalyst TBAF, confirming that Si—H can react with unsaturated bonds in the presence of the catalyst. Therefore, solvents containing unsaturated bonds involving heteroatoms are not preferred for use in the polysilazane composition when TBAF or a similarly behaving catalyst is used.

Coefficient of Friction (CoF)

Sample 48T-2 was compared with polished Teflon in a CoF test. With Teflon counter surface (40 MPa) and alumina counter surface (500 MPa), a pure and a well-polished Teflon sheet gave a CoF of 0.05-0.06 and 0.07-0.08 respectively, while sample 48T-2 gave 0.01-0.015 for both countersurfaces. Further tests at lower Hertzian contact pressure of 250 MPa (alumina ball) on 48T-2 indicated a CoF of 0.03-0.04. 48T-2 was chosen because of its smoother surface and polishing nature. However, further tests at 20 MPa (Teflon ball) and 250 MPa (alumina ball) on 48T showed CoF values of 0-.02 to 0.03, slightly lower than 48T-2. These results indicate a very low CoF of the 48 series coatings.

Normally, it is expected that CoF and applied load are correlated so that with higher load one would expect to measure higher CoF. The opposite trend was observed with the 48T-2 coating. An explanation for this observation may be that the ball-like POSS additives can change sliding friction to rolling friction in the contact/interface so that the lubrication mechanism is that of nano-bearing.

Further Experiments (Part of Planned Experiments Below)

Experiment 2

Compared to fully fluorinated POSS (e.g structure IV), The POSS samples with mixed fluorinated and non-fluorinated R groups yielded better coating properties, mainly absence of haziness and non-uniform appearance and especially better visual appearance with ultrasonic spray coating. The dumbbell shaped POSS were better overall, e.g. coating hardness, lower refractive index and visual appearance.

Table 2 below is a summary of the effect of POSS XIII concentration on coating hydrophobicity and surface roughness. To prepare the coatings, D1500RC (200 µl) and TG4 were mixed in an Eppendorf tube (solution A, 0.5 ml total volume). Solution B (0.5 ml total volume) contained POSS XIII at different concentrations with respect to polysilazane and TBAF. Both solutions were mixed by vortexing and combined to yield a composition with 22 wt % polysilazane, 0.03 wt % TBAF and 0.6 wt % TG4. As mentioned earlier, the percentage of curing agent in D1500 RC is reported to be between 10 and 30 wt % with respect to the polysilazane molecule. After 5 minutes of mixing solution A and B, 200 µl of the resulting solution was dropped on a glass slide and spread with a glass rod. The coatings were dried on a hot plate maintained at 100° C. for 10 min. Thereafter the coating was cured in a high humidity atmosphere containing $H_2O_2$ vapour WDRV—water droplet rolling volume—the amount of water (µl) which rolled off the surface of the coating when inclined at 45 degrees, and sliding angle (SA), the angle at which 12 µl of water began to slide off the surface of the coating were measured using locally fabricated setup.

All coatings showed resistance to permanent markerbeading and ease of wiping off.

To minimise the effect of the more hydrophobic D1800 only 1500RC was used. For coating with no POSS or catalyst (PS+TG4) WDRV and sliding angle were significantly higher, indicating less tendency of easy-cleaning and water repellency. The FT-IR data also indicates a lower curing level compared to coatings with POSS The lowest WDRV and SA were recorded for coating with 3 wt % XIII, with 1.5 wt % having more or less similar values. Further increase in POSS concentration to 4.5 wt % led to higher WDRV and SA compared to coating with lower POSS concentration. This may be due to the effect of higher fragmentation with increasing amount of POSS, an effect which may be countered with increasing amount of TBAF. The latter is not without its limitation: increasing the amount of catalyst leads to higher reactivity (evident by stronger bubbling) which increases the difficulty in controlling the coating process. However, the hydrophobicity of the 4.5 wt % POSS coating is still better than that of PS+TG4.

TABLE 2

Coating composition characteristics

| Sample | POSS content (wt %) | Polysilazane | WDRV | Sliding angle | Surface roughness |
|---|---|---|---|---|---|
| PS + TG4 | 0 | D1500RC | 16 | 55 | 10 |
| A | 1.5 | " | 4 | 15 | 20 |
| B | 3 | " | 4 | 12 | 38 |
| C | 4.5 | " | 8 | 28 | 28 |

The higher surface roughness of the coatings containing POSS and TBAF may be due to reactions in the coating formulation-solution cross-linking and incorporation of POSS to the polymer chains Experiments 3D1500RC (360 µl), D1800 (40 µl), MTHF (800 µl) and TG4 were mixed in an Eppendorf tube (solution A, 1.4 ml total volume). Solution B (2.6 ml total volume) contained Dibutyl ether (1600 µl), TBAF, and POSS XIV. Both solutions were mixed by vortexing and combined to yield a composition containing about 12 wt % polysilazane, 0.012 wt % TBAF, and 0.3 wt % TG4. After 5 minutes of mixing, 200 µl of the resulting solution was dropped on a glass slide and spread with a glass rod. The volume ratio of MTHF: DBE in the coating formulation was 1.5:1. TG4, POSS XIV, and TBAF were dissolved in MTHF only before appropriate volumes were taken for the coating formulation.

The coatings were dried in an oven maintained at 80° C. for 10 mins. Furthermore, MTDS-1 and MTDP-1 were cured in a high humidity atmosphere containing $H_2O_2$ vapour. MTDS-4 was left in ambient environment after the drying step. To allow sufficient time for MTDS-4, the pencil hardnesses of these coatings were analysed after 14 days; results are presented in Table 3

TABLE 3

| Sample | POSS XIV (wt %) | Pencil hardness |
|---|---|---|
| MTDS-1 | 2.25 | 4H |
| MTDS-4 | 2.25 | 3B |
| MTDP-1 | 1.125 | 2H |

The difference in hardness between MTDS-1 and MTDP-1 shows the importance of optimum POSS concentration for coating hardness.

The poor pencil hardness of MTDS-4 is due to suboptimum curing of polysilazane (hydrolysis of Si—NH—Si and Si—H to form Si—OH followed by condensation to form Si—O—Si). This is confirmed by FT-IR spectra (FIG.

8) which show that the peak positions at about 900 and 1260 cm$^{-1}$, belonging to Si—NH—Si and Si—H, respectively, are still strong in MTDS-4 compared to the other coatings. The authors have also discovered that for reference samples (lacking either POSS or TBAF or both), hydrolysis and polycondensation of these functional groups is also limited, especially Si—NH—Si.

The presence of uncured polar groups (Si—NH—Si and Si—H) can limit the application of coatings in environments where humidity and pollutants are present, especially pollutants which are capable of hydrogen or covalent bonding or chemical interactions with them. As an example, the authors have discovered that in less than 24 hrs after coating preparation, wiping a coating which is cured in ambient condition or cured with only water vapour with a cloth soaked in acetone or isopropanol can damage the coating.

All the coatings in table 3, including MTDS-4, showed repellency to permanent marker. The glass slide substrates were plasma activated (after cleaning) for 15 seconds using a diffuse coplanar surface barrier discharge (DCSBD) atmospheric plasma system Experiment 4

D1033 (80 µl), D1800 (20 µl), THF: MPB (1:1) (300 µl) and TG4 were mixed in an Eppendorf tube (solution A, 500 µl total volume). Solution B (500 µl total volume) contained THF, MPB, TBAF, and POSS X. Both solutions were mixed by vortexing and combined to yield a composition with approximately 10 wt % polysilazane, 0.5 wt wt % TG4, and 2.7 wt % POSS X. After 5 minutes of mixing solution A and B, 200 µl of the resulting solution was dropped on a glass slide and spread with a glass rod. The volume ratio of THF to MPB was about 3.5:1. TG4, POSS X, and TBAF were dissolved in THE only before appropriate volumes were taken for the coating formulation.

The coatings were dried in an oven maintained at 80° C. for 10 mins and cured in a high humidity atmosphere containing H$_2$O$_2$ vapour.

TABLE 4

| TBAF wt % | Refractive index |
|---|---|
| 0 | 1.49 |
| 0.011 | 1.468 |
| 0.022 | 1.442 |
| 0.033 | 1.445 |
| 0.044 | 1.457 |

Depending on the amount of reactive POSS, there is an optimum concentration of catalyst (TBAF) which gives the lowest refractive index. The high refractive index of the reference coating with 0 wt % TBAF may be attributed to non-uniformity in surface roughness and/or relative high concentration of polar groups from polysilazane (poor or limited hydrolysis and polycondensation), as seen with infra-red spectroscopy. The slight increase in refractive index after 0.22 wt % TBAF may be an indication of excessive solution cross-linking, which, as already shown in 48-T40, can lead to bigger particulates in the coating. Experiment 5D1500RC (720 µl), D1800 (80 µl), THF (1600 µl) and TG4 were mixed in an Eppendorf tube (solution A, 2.800 ml total volume). Solution B (5.200 ml total volume) contained Dibutyl ether (3200 µl), TBAF, and POSS VIII, Both solutions were mixed by vortexing, and combined to yield a composition with 11.4 wt % polysilazane, 0.013 wt % TBAF, 0.3 wt % TG4, and 2.3 wt % POSS VIII. The volume ratio of THF to DBE was 1.5:1. POSS VII, TG4 and TBAF were dissolved in THF only before appropriate volumes were taken for the coating formulation After 5 minutes of mixing solution A and B, 4 ml of the resulting solution was put in a syringe and mounted in an ultrasonic spray coater from LRS AS. The frequency of the nozzle, which was operated at 50% power output, was 45 Hz while the syringe speed (liquid flow rate) was 35 mm/s. Plasma activated (15 s) and non activated glass slides were used as substrates. The coatings were dried in an oven maintained at 80° C. for 10 mins and curing carried out in a high humidity atmosphere containing H$_2$O$_2$ vapour. For the plasma activated substrate, coating pencil hardness was F and 2H after 48 hrs and 7 days, respectively. For the coating on non-activated substrate, the values were B and HB after 48 hrs and 7 days, respectively. Plasma activation therefore enhanced coating adhesion through better wetting.

Experiment 6

The coating preparation steps, composition, drying and curing are the same as in experiment 5 except that MTHF replaced THF and POSS XV was used instead of POSS VIII Uncoated and hard-coated flat polythiourethane (PTU) lens materials were cleaned, and plasma activated for 15 s prior to coating application by ultrasonic spray coating. For transmittance studies, the coatings were applied on both sides of flat substrates.

With application of the coatings on both sides of the PTU substrates, increased transmittance of about 4 to about 5% was recorded for hard-coated and uncoated PTU substrates, respectively, which is a consequence of lower refractive index of the coating. Transmittance therefore increased to about 93% at 500 nm. This is about or close to the transmittance of the predominant eyewear material, CR39, which is neither scratch resistant or anti-soiling. Coating hardness of 4B and HB were recorded for the uncoated and hard-coated PTU, respectively. With application of the coatings of the present invention, the hardness increased for uncoated and hardcoated PTU lens to HB and F, respectively. Furthermore, the coatings showed very good to excellent repellency and ease of wiping to permanent markers, including one from a prominent eyewear manufacturer. The coatings were successfully applied to curved PTU lenses, dried and cured using same procedure as above. The same permanent marker test results as on flat substrates were obtained. In fact, it was much easier to wipe off the permanent markers from the coating of the present invention compared to lenses (curved) with commercial anti-soiling coating (they were received from a local eyewear company with the anti-soiling coatings already applied). Therefore the coatings of the present invention has the capacity to act as both the scratch resistant and anti-soiling layer on eyewears and related products, with an additional advantage of enhanced light transmittance for high index materials.

The following experiments are planned (Table 5):
Planned Experiments

TABLE 5

Percentage composition of polysilazane and nanoadditives/molecules in coating formulations

| | Coating component percentage | | | | | | | | | | | | | | | | | | |
|---|---|---|---|---|---|---|---|---|---|---|---|---|---|---|---|---|---|---|---|
| | Polysilazane (PS) | | | | | | | | | | POSS (P) | | | | | | | | |
| | D1500 RC | | D1500 SC | | D1033 | | D1800 | | PHPS | | NA1 | | NA2 | | NA3 | | | | |
| Exp | min | max | min | max | min | max | min | max | min | max | min | max | min | max | min | max | | | |
| A | 0.5 | 30 | 0 | 0 | 0 | 0 | 0 | 0 | 0 | 0 | 0.05 | 10 | 0.005 | 3 | 0.05 | 10 | | | |
| B | 0.4 | 27 | 0 | 0 | 0 | 0 | 0 | 0 | 0.1 | 7.5 | 0.005 | 7 | 0.005 | 3 | 0.005 | 7 | | | |
| C | 0.4 | 27 | 0 | 0 | 0 | 0 | 0.05 | 3 | 0.1 | 7.5 | 0.05 | 10 | 0.005 | 3 | 0.05 | 10 | | | |
| D | 0.5 | 27 | 0 | 0 | 0 | 0 | 0.05 | 3 | 0 | 0 | 0.05 | 10 | 0.005 | 3 | 0 | 0 | | | |
| E | 0.4 | 27 | 0 | 0 | 0 | 0 | 0 | 0 | 0.1 | 7.5 | 0.05 | 10 | 0 | 0 | 0 | 0 | | | |
| F | 0.3 | 20 | 0 | 0 | 0 | 0 | 0.2 | 5 | 0.1 | 7.5 | 0.05 | 10 | 0 | 0 | 0 | 0 | | | |
| G | 0.3 | 20 | 0.1 | 5 | 0 | 0 | 0.1 | 10 | 0 | 0 | 0.05 | 10 | 0 | 0 | 0 | 0 | | | |
| H | 0.5 | 30 | 0 | 0 | 0 | 0 | 0 | 0 | 0 | 0 | 0.05 | 10 | 0.005 | 3 | 0.05 | 10 | | | |
| I | 0.5 | 30 | 0 | 0 | 0 | 10 | 0 | 0 | 0 | 0 | 0 | 0 | 0.05 | 12 | 0 | 6 | | | |
| J | 0 | 0 | 0.3 | 20 | 0.2 | 10 | 0 | 0 | 0 | 0 | 0.05 | 10 | 0 | 0 | 0 | 0 | | | |
| K | 0 | 0 | 0.35 | 20 | 0.15 | 10 | 0 | 0 | 0 | 0 | 0.05 | 10 | 0 | 0 | 0 | 0 | | | |
| L | 0 | 0 | 0.35 | 20 | 0 | 0 | 0.15 | 10 | 0 | 0 | 0.05 | 10 | 0 | 0 | 0 | 0 | | | |
| M | 0 | 0 | 0 | 0 | 0.05 | 5 | 0 | 0 | 0.1 | 5 | 0.005 | 2 | 0.005 | 4 | 0 | 0 | | | |

| | Coating component percentage | | | | | | | | | | | | | | |
|---|---|---|---|---|---|---|---|---|---|---|---|---|---|---|---|
| | POSS (P) | | | | | | (Poly)siloxane | | | | Cellulose nanofibre | | | | |
| | NA4 | | NA5 | | NA6 | | NA7 | | NA8 | | NA9 | | NA10 | | PS + P | |
| Exp | min | max | min | max | min | max | min | max | min | max | min | max | min | max | min | max |
| A | 0 | 0 | 0 | 0 | 0 | 0 | 0.05 | 3 | 0 | 0 | 0 | 0 | 0.05 | 2 | 0.71 | 58 |
| B | 0 | 0 | 0 | 0 | 0 | 0 | 0.05 | 3 | 0 | 0 | 0 | 0 | 0 | 0 | 0.57 | 54.5 |
| C | 0 | 0 | 0 | 0 | 0 | 0 | 0.005 | 3 | 0 | 0 | 0 | 0 | 0 | 0 | 0.66 | 63.5 |
| D | 0 | 0 | 0 | 0 | 0 | 0 | 0.05 | 3 | 0.05 | 12 | 0 | 0 | 0 | 0 | 0.71 | 58 |
| E | 0 | 0 | 0.05 | 3 | 0 | 0 | | | 0 | 0 | 0.05 | 3 | 0 | 0 | 0.65 | 50.5 |
| F | 0.1 | 5 | 0.05 | 3 | 0 | 0 | 0 | 0 | 0 | 0 | 0.05 | 3 | 0 | 0 | 0.85 | 53.5 |
| G | 0.1 | 5 | 0 | 0 | 0 | 0 | 0 | 0 | 0.05 | 12 | 0 | 0 | 0.05 | 3 | 0.75 | 65 |
| H | 0 | 0 | 0 | 0 | 0.05 | 2 | 0.05 | 3 | 0 | 0 | 0.05 | 2 | 0 | 0 | 0.76 | 60 |
| I | 0 | 0 | 0 | 0 | 0 | 0 | 0.05 | 3 | 0 | 12 | 0 | 2 | 0 | 0 | 0.6 | 75 |
| J | 0.05 | 9 | 0 | 0 | 0 | 0 | 0.05 | 9 | 0 | 0 | 0.05 | 2 | 0 | 0 | 0.7 | 60 |
| K | 0.05 | 9 | 0 | 0 | 0 | 0 | 0.05 | 9 | 0 | 0 | 0.05 | 2 | 0 | 0 | 0.7 | 60 |
| L | 0.05 | 9 | 0 | 0 | 0 | 0 | 0.05 | 9 | 0 | 0 | 0.05 | 2 | 0 | 0 | 0.7 | 60 |
| M | 0 | 0 | 0.005 | 2 | 0 | 0 | 0.05 | 2 | 0 | 0 | 0.005 | 2 | 0 | 0 | 0.22 | 22 |

In Table 5, the components are defined as follows:

POSS: (based on T8 closed cage structure, structure III, but applicable to other caged and non-caged structure, in the same ratio of R groups):

NA1: 0-7 R groups are $Y(CF_2)_nCF_3$, 0-7 R groups are non-fluorinated and contain aryl (e.g. phenyl) and/or alkyl (e.g. methyl, propyl, isobutyl, isooctyl), and/or (poly)siloxane (e.g. low molecular weight siloxane of 180-800 g/mol), while 1-3 R groups are non-fluorinated and comprise one or more nucleophilic groups which are capable of reacting with polysilazane and causing fragmentation, e.g. 3-propylamine ($NH_2$ reactive unit), 3 propyl methacrylate (C=O reactive unit), 2-propoxyethanol (OH reactive unit). Y may be an alkyl, aryl, ether, siloxane or any combination thereof, or it may be a bond—in which case the fluorinated group is directly bonded to the Si of the POSS cage. n is an integer from 0 to 7.

NA2: 0-6 R groups are $Y(CF_2)_nCF_3$, 1-6 R groups are non-fluorinated and contain aryl and/or alkyl, and/or siloxane, while 1-6 R groups are non-fluorinated and comprise alkoxysilyl, such as methoxysilyl and ethoxysilyl. n is an integer from 0 to 7. NA3: 1-6 R groups are $Y(CF_2)_nCF_3$, 1-6 R groups are non-fluorinated and comprise alkoxysilyl, such as methoxysilyl, ethoxysilyl, while 1-2 groups are non-fluorinated and comprise one or more nucleophilic groups which are capable of reacting with polysilazane to cause fragmentation. n is an integer from 0 to 7

NA4: 1-6 R groups comprise alkoxysilyl while 1-2 R groups contain one or more nucleophilic groups which are capable of reacting with polysilazane to cause fragmentation.

NA5: All R groups comprise alkoxysilyl groups, with no other groups identified above.

NA6: 5-7 R groups are non-fluorinated and contain aryl (e.g. phenyl) and/or alkyl (e.g. methyl), and/or siloxane, while 1-3 R groups are non-fluorinated and comprise one or more nucleophilic groups which are capable of reacting with polysilazane and causing fragmentation.

Polysiloxane: Straight, branched or cyclic; structure X is an example.

NA7: 1-3.5 R groups are $Y(CF_2)_nCF_3$, 0.5-3 R groups are non-fluorinated and contain aryl or alkyl, while 0.5-3 R groups are non-fluorinated and comprise alkoxysilyl. n is an integer from 0 to 7.

NA8: 1-3.5 R groups are $Y(CF_2)_nCF_3$, 0.5-3 R groups are non-fluorinated and comprise alkoxysilyl while 0.5-1 R groups are non-fluorinated and contain one or more nucleophilic groups which are capable of reacting with polysilazane to cause fragmentation. n is an integer from 0 to 7.

R may be hydrogen or contain Si—H in NA7-NA8, such as 0.5-1 hydrogen atoms or 0.5-1 Si—H group NA9: E.g. cellulose nanofibers where some of the hydroxyl groups have been replaced with organofluorine groups or molecules containing them; and/or some hydroxyl groups replaced with alkyl or aryl groups or molecules containing them, and some hydroxyl groups remain unreplaced.

NA10: As in NA9 but with some or the remaining hydroxyl groups replaced with molecules bearing functional groups which can react with polysilazane to cause fragmentation, e.g 2-propoxyethanol, 3-aminopropyl.

D1033 denotes the polysilazane of structure XI, wherein X and Y are reported to be 0.33 and 0.67 respectively.

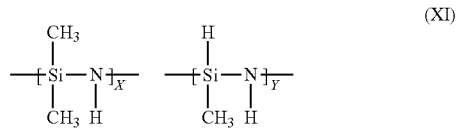

Further components that will be included in the experiments, but that are not listed in table:
1. Nucleophilic catalysts, such as quaternary ammonium salt, added in an amount of 0.001-2 wt %
2. Levelling agents, such as TG4 or a fluorinated levelling agent (e.g. perfluoropolyther-modified TG4), to be added in an amount of 0.001-2 wt % of the coating composition.
3. Solvent, which may be an ether such as tetrahydrofuran, dibutyl ether, or methoxyperfluorobutane, or an aromatic solvent such as xylene, or other polar aprotic and non-polar solvents which do not comprise functional groups that may react with polysilazane. The solvent may be mixed or single and constitute 20-99% of the coating composition.
4. Fluorinated analogs may be used to partially or completely replace one or all of the polysilazanes in a given coating composition, giving rise to a modified form of the coating presented in the table.

The various additives are designed to perform the same functions as already described. The table represents a guide to planned experiment, with the composition designed to address typical challenges already identified. For example:
1. the reduced amount of NA1 and NA3, and the absence of NA10 in coating B, compared to A may help to engender a better control of solution reactivity in the presence of the more reactive PHPS, since the aforementioned additives contain reactive groups. Control of solution reactivity may also benefit from the lower PS+P concentration, with respect to the solvent. The same applies to coating E and F.
2. Significant presence of the bulkier D1800 in coating C may help control solution reactivity in the presence of PHPS, since NA1 and NA3 have been restored to their earlier concentration in coating A. In the same manner, use of NA9 in coating E or the absence of the more reactive NA10 in all compositions comprising PHPS may help control solution reactivity.
3. With increase concentration of reactive POSS in coating G-sum of NA1, NA4, NA8 and NA10-concentration of the bulkier and slower reacting D1800 is increased to afford more flexibility in control of solution reactivity.
4. The use of D1800 may lead to a more flexible film, due its longer R group compared to D1500 RC, for example. The same effect may be achieved by the choice of type and length of R groups, e.g. the more flexible (poly)siloxane and polyether group may be used.
5. Nucleophilic functional (reactive) groups present in NA1, NA3, NA4, NA6, NA8, NA9 and NA10 may bind these covalently to the polysilazane backbone, ensuring a uniform distribution of the additives in the polysilazane matrix. This is why they may be used in higher concentration compared to NA2, which has no reactive nucleophilic group.
6. Alkoxysilyl groups anchored on NA2-NA5 and NA7-NA8 will ensure faster hydrolysis and curing in the presence of moisture. Since some of these additives also contain reactive groups, the distribution of the alkoxysilyl groups in the coating matrix will be optimised.
7. Fluoro groups or substituent for example on NA1 and NA8 and may enhance anti-soiling and low-friction characteristics.
8. The choice of aryl and alkyl groups may, sometimes in tandem with organofluoro groups, improve the stability and dispersion of nanoadditives in coating formulation, which is the first step towards coating composition uniformity. This will be achieved by matching their polarity to that of polysilazane and solvent.
9. When NA2 contains a reactive group which is fluorinated, it will normally float to the top of the coating composition. This, within a certain concentration limit, may improve anti-soiling and refractive index properties. Said limit may be less than 3% concentration in the coating composition, may be preferably equal or less than 1%. The upper limit of NA2 is intentionally kept lower than the fluorinated POSS with reactive groups for example. When an upper concentration limit—to be determined is passed—the fluoro groups in NA2 and other fluorinated additives may begin to stick together and cause coating haziness.
10. Coating I which may have a high concentration of fluorinated NA2 is intended to provide anti-soiling and/or low friction properties but not necessarily high transparency.
11. The presence of alkoxysily groups in NA2 will ensure the additive is covalently bound to the coating matrix-through the hydrolysis-generated silanols-thereby forestalling any problem with leaching.

Coating Application and Curing:

The coatings may be applied by ultrasonic spray coating, pneumatic spray coating, roller coating or any other process known in the art.

Curing with be accomplished by one or more of heat (e.g. infra red heating), plasma, UV, and other methods known to facilitate hydrolysis leading to formation of silanols and polycondensation. The humidity during curing will be optimised.

Coating Characterisation:

The Coatings Will be Characterised for
1. Refractive index, e.g using an ellipsometer or Abbey 5 refractometer
2. Transmission
3. Chemical analysis to identify functional groups and extent of curing, surface chemical species and failure mechanisms under UV, damp heat or chemical and environmental attacks. FT-IR, XPS, EDS and other known techniques may be employed 4. Hardness, wear and scratch resistance by known processes such as tribometry, pencil hardness, abrasion tester, etc
5. Anti-soiling and ease of cleaning characteristics
6. Water contact angles
7. CoF
8. Other known methods to qualify and optimise the coating for use in low friction, anti-soiling, self-cleaning and easy-to-clean transparent coatings may be utilised.

The invention claimed is:

1. A composition comprising
   i) 0.5-30 wt %, based on the weight of the composition, of a polysilazane component selected from the group comprising organic polysilazanes, inorganic polysilazanes, and mixtures of any two or more organic and/or inorganic polysilazanes;
   ii) 0.1-15 wt %, based on the weight of the composition, of a POSS comprising at least one nucleophilic group;
   iii) 0.0001-2 wt %, based on the weight of the composition, of a quaternary ammonium salt $R^1R^2R^3R^4N^+X^-$, wherein each of $R^1$, $R^2$, $R^3$, and $R^4$ is independently selected from the group comprising alkyl, aryl, arylalkyl, alkoxysilyl, and alkenyl, and wherein X is selected from F, Cl, Br, I, $PF_6$ or $BF_4$ and OH; and
   iv) an inert solvent.

2. The composition according to claim 1 further comprising 1-30 wt %, based on the weight of the polysilazane component, of a curing agent.

3. The composition according to claim 1, further comprising 0.005-5 wt %, based on the weight of the composition, of a POSS comprising no nucleophilic group.

4. The composition according to claim 1, further comprising 0.01-1.5 wt %, based on the weight of the composition, of a flow levelling agent.

5. The composition according to claim 1, further comprising 0.05-5 wt %, based on the weight of the composition, of a photoinitiator.

6. The composition according to claim 1, further comprising 0.01-10 wt %, based on the weight of the composition, of a nanofibre.

7. The composition according to claim 1, wherein the at least one nucleophilic group is selected from C=O, OH, $NH_2$, NH, S=O, SH, C=N, epoxy, or C≡N.

8. The composition according to claim 1, wherein the POSS further comprises a fluoro substituent.

9. The composition according to claim 8, wherein the POSS comprises a $C_1$-$C_5$ fluoroalkyl group bearing 1-10 fluoro substituents.

10. The composition according to claim 8, wherein the POSS comprising no nucleophilic group comprises at least one alkoxysilyl group.

11. The composition according to claim 1, wherein the POSS does not comprise a fluoro substituent.

12. The composition according to claim 1, wherein the POSS has a combination of fluoro and non-fluoro substituents.

13. The composition of claim 1, wherein the POSS comprises a dumbbell structure.

14. The composition according to claim 1, wherein each of $R^1$, $R^2$, $R^3$, $R^4$ is a tert-butyl group.

15. Use of a composition according to claim 1 for coating a substrate.

16. A substrate comprising a coating, wherein the coating is made at least in part from a composition according to claim 1.

* * * * *